(12) United States Patent
King

(10) Patent No.: US 11,003,456 B2
(45) Date of Patent: May 11, 2021

(54) PIPELINED PROCESSING OF PLANT IMAGES FOR MONITORING HORTICULTURAL GROW OPERATIONS

(71) Applicant: IUNU, INC., Seattle, WA (US)

(72) Inventor: Matthew Charles King, Seattle, WA (US)

(73) Assignee: IUNU, INC., Seattle, WA (US)

(*) Notice: Subject to any disclaimer, the term of this patent is extended or adjusted under 35 U.S.C. 154(b) by 0 days.

(21) Appl. No.: 16/368,722

(22) Filed: Mar. 28, 2019

(65) Prior Publication Data

US 2019/0303164 A1  Oct. 3, 2019

Related U.S. Application Data

(60) Provisional application No. 62/650,872, filed on Mar. 30, 2018.

(51) Int. Cl.
*G06T 1/20* (2006.01)
*G06F 9/38* (2018.01)
*G06F 9/48* (2006.01)

(52) U.S. Cl.
CPC .......... *G06F 9/3855* (2013.01); *G06F 9/4881* (2013.01); *G06T 1/20* (2013.01)

(58) Field of Classification Search
CPC . G06T 1/60; G06T 1/20; G06F 9/3855; G06F 9/4881
USPC ................................ 345/501, 502, 506, 530
See application file for complete search history.

(56) References Cited

U.S. PATENT DOCUMENTS

| 7,768,517 | B2 * | 8/2010 | Diard ........................ G06T 1/20 341/51 |
| 2006/0212872 | A1 * | 9/2006 | Raghunath .............. H04L 45/60 718/105 |
| 2006/0251292 | A1 * | 11/2006 | Gokturk .................. G06F 16/58 382/103 |
| 2008/0005392 | A1 | 1/2008 | Amini et al. |

(Continued)

FOREIGN PATENT DOCUMENTS

WO  2014100502 A1  6/2014

OTHER PUBLICATIONS

International Application No. PCT/US2019/024873, Search Report and Written Opinion dated Jun. 21, 2019, 15 pages.

(Continued)

*Primary Examiner* — Jacinta M Crawford
(74) *Attorney, Agent, or Firm* — Han Santos, PLLC; Gloria M. Steinberg

(57) ABSTRACT

Disclosed is a technique for providing one or more virtual machines or one or more software containers provided by cloud services to manage a horticultural operation. The techniques include transmitting, from the image dispatcher service, the image data to a first computing instance that executes a first subprocess of an image processing pipeline. Using the first subprocess of the image processing pipeline, partially processed image data is generated from the image data. The partially processed image data resulting from the first subprocess is then transmitted from the first computing instance to a second computing instance that executes a second subprocess of the image processing pipeline. Thereafter, a fully image processed image associated with the image data is produced via at least the second subprocess of the image processing pipeline.

20 Claims, 14 Drawing Sheets

(56) References Cited

U.S. PATENT DOCUMENTS

| | | |
|---|---|---|
| 2009/0064154 A1 | 3/2009 | Aulbach |
| 2010/0054394 A1 | 3/2010 | Thibault et al. |
| 2010/0329564 A1 | 12/2010 | Hervas et al. |
| 2013/0314428 A1 | 11/2013 | Chen et al. |
| 2018/0074752 A1* | 3/2018 | Nakazono ............. G06F 3/0656 |

OTHER PUBLICATIONS

Australian Patent Application No. 2019245343. Examination report dated Feb. 16, 2021, 5 pages.

* cited by examiner

1

PIPELINED PROCESSING OF PLANT IMAGES FOR MONITORING HORTICULTURAL GROW OPERATIONS

CROSS-REFERENCE TO RELATED PATENT APPLICATIONS

This application claims priority to U.S. Provisional Patent Application No. 62/650,872, filed Mar. 30, 2018, and entitled "Pipelined Processing of Plant Images for Monitoring Horticultural Grow Operations," which is hereby incorporated by reference in its entirety.

BACKGROUND

Modern industrial horticultural operations include not merely the planting, cultivation, and harvesting of plants, but performing those operations with multiple plants, conditions, greenhouses, grow operations, and people, all in different geographic locations. Accordingly, collecting and marshaling of this information towards a coherent and effective horticultural operation is difficult. Generally, a master grower regularly collects information about a horticultural operation, identifies problems, identifies solutions for those problems and applies them for remediation. This monitoring and remediation cycle may be called a horticultural feedback loop.

Specifically, because the environments surrounding different respective grow operations vary widely, and much information is spread over different locations, a collection of information for a horticultural operation is difficult. Furthermore, information collected is generally of low fidelity, of dubious provenance, untimely, incomplete, and does not lend itself for determining a course of remedial action, let alone coordinate an operation-wide response. Even where information is collected in a centralized location, the information is not in a state to perform automated hi-fidelity, and therefore accurate, diagnosis and remediation.

The techniques discussed herein allows for the collection of hi-fidelity, reliable, timely, and complete information, which in turn is used for automated diagnosis and remediation, thereby providing the ability to implement an effective horticultural operational feedback loop.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
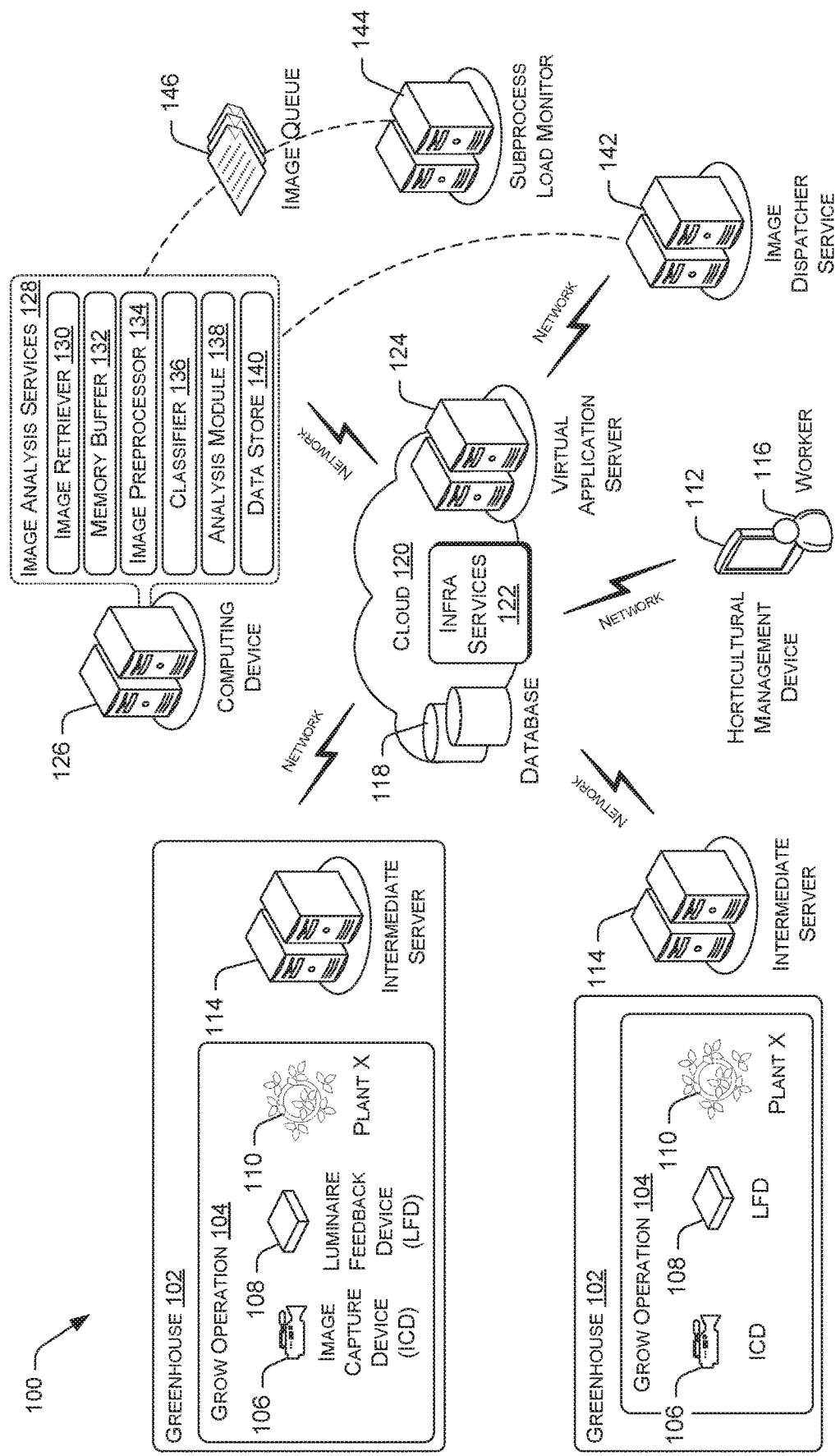
FIG. 1 is a top-level context diagram for object recognition horticultural based feedback analysis.

A horticultural feedback loop is the regular and periodic monitoring of a horticultural operation to collect information about the operation, and to identify problems in the operation, solutions to those problems, and to perform remediation. A horticultural operation may include planting, cultivation, and harvesting of plants. Accordingly, information to be collected in a horticultural feedback loop will include manual spot checks on plants, which is a labor-intensive process. Additionally, there are a large number of variables including factors that may vary across location (e.g., people, climate, mechanical problems, etc.) that provide contextual information around plant measurements. Thus, environmental variables and other non-plant variables must be considered when collecting information.

An Object Recognition Based Horticultural Feedback Analysis (ORB-HFA) system is used to automate the spot-checking process and to reduce variations in data resulting from multiple factors. In various embodiments, an image capture device such as digital video camera, a still image digital camera, and/or via an unmanned aerial vehicle (UAV), may be used to take still images of plants or discretely defined group of plants periodically to regularly monitor the plants. The images may be collected, centralized, and then analyzed using computer object-recognition techniques and computer image analysis techniques to provide a critical mass of information for accurate automated diagnosis and recommendations for remediation.

The ORB-HFA system may facilitate providing remediation recommendations that may be dispatched to workers operating in various locations. Because the individual plants and their respective environments are being constantly monitored, the ORB-HFA system enables real-time or near real-time response and monitoring. For example, a remediation recommendation may be dispatched on one day, and a follow-up operation to determine the efficacy of the remediation recommendation may be performed later that same day.

The ORB-HFA system may also facilitate collecting data across an entire horticultural operation in a comprehensive manner. More specifically, because the data collection process is automated and can be implemented on a large-scale, the state of individual plants may be monitored at all times. For example, a plant may be compared to the growth performance of past similar plants, or to the growth performance of other plants in the same horticultural operation. Thus, the ORB-HFA system can aggregate a critical mass of data to provide historical information that will allow a master grower to incorporate past experience in determining potential remediation courses of action. Some analysis may make use of machine learning/big data techniques. The results of this analysis may then be fed back into the ORB-HFA system to improve future diagnosis and remediation recommendations.

The ORB-HFA system also permits the application of computer object-recognition and computer image analysis techniques to provide a detailed analysis of each plant. For instance, each branch, leaf (or needle), root, and topology of a plant may be analyzed. Furthermore, the computer image analysis techniques can include color analysis to detect changes in color, such as the premature browning of leaves. Moreover, because each plant is being monitored, sequential analysis, or the comparison of images over time, may be applied to capture changes of the same plant over time. The techniques described herein may be implemented in a number of ways. Example implementations are provided below with reference to the following figures.

Example Architecture

FIG. 1 provides an exemplary context diagram 100 illustrating an ORB-HFA feedback loop that implements an image processing pipeline. A horticultural operation may cover one or more locations, such as a greenhouse 102. A greenhouse 102 may have one or more grow operations 104 each with one or more plants 110. The plants 110 can comprise a single type of plant or multiple types of plants. In various embodiments, a single grow operation 104 may include multiple plants in different locations/greenhouses 102. Specifically, a grow operation 104 is a logical group of plants 110 that are similarly situated such that the cultivation of each plant in the group is substantially similar.

One or more image capture devices 106 are located at each grow operation 104 to capture images of plants 110 or discretely defined groupings of plants and information related to each plant 110 for the horticultural feedback loop. In some embodiments, each individual plant may have a single dedicated image capture device 106. The image capture device 106 may be a digital video camera or may be a still image camera configured to capture images periodically and/or on demand. The image capture device may also comprise a UAV configured to capture images periodically and/or on demand. Generally, an image capture device 106 may take visible light spectra pictures but may also extend to non-visible spectra such as infrared and ultraviolet. The image capture device 106 may have an onboard application programming interface (API) enabling programmatic control. Alternatively, the image capture device 106 may be networked thereby enabling remote control. The image capture device 106 may be controlled via an image caption function. The image capture function may be a part of the image capture device and/or a part of a luminaire feedback device 108. In another implementation, the image capture function may be hosted on a computing device.

The luminaire feedback device 108 provides light on a plant 110 and may be configured to change spectrum and intensity of the light on the plant 110 based on feedback from the visual observer devices 106 and/or other sensors. In some embodiments, the luminaire feedback device 108 may incorporate the image capture device. Furthermore, the luminaire feedback device 108 may operate in a network environment. Accordingly, the luminaire feedback device 108 may use internal logic to capture images with the image capture device and adjust the light spectrum and/or intensity based on an analysis. In some embodiments, the luminaire feedback device 108 may be configured to adjust light spectrum and/or intensity according to a remediation course of action, which can include one or more tasks to address an identified problem.

In various embodiments, the luminaire feedback device 108 and/or the image capture device 106 may transmit images and other information to a central computing device 126 for providing image analysis services 128. The computing device 126 can comprise an image processing server, depending upon embodiments. Optionally, an intermediate server 114 may be used to store and/or queue the captured images and other information. The intermediate server 114 may in turn subsequently forward the captured images to the image analysis services 128. The intermediate servers 114 may also directly send the captured images to the image analysis services 128 if the image analysis services 128 and the intermediate servers 114 are on the same network. Additionally, or alternatively, the intermediate servers 114 may route the captured images to the image analysis services 128 via the Internet and/or the cloud 120. In other embodiments, the image analysis services 128 may be hosted in a virtual machine on the cloud 120. In some cases, the intermediate server 114 may be an on-premise or an off-premise server.

The cloud 120 may also be utilized to provide the services associated with an intermediate server 114 and/or a central computing device 126. The intermediate server 114 and/or the central computing device 126 may either be a physical dedicated server or may be a virtual machine. In the latter case, the cloud 120 may represent a plurality of disaggregated servers which provide virtual application server 124 functionality and virtual storage/database 118 functionality. The disaggregated servers may be physical computer servers, which may have a processor, a memory, an I/O interface and/or a network interface. The features and variations of the processor, the memory, the I/O interface and the network interface are substantially similar to those described for the host of the image capture function (e.g., a luminaire feedback device 108), the intermediate servers 114, and/or the computing device 126. Differences may be where the disaggregated servers are optimized for throughput and/or for disaggregation.

Cloud services may be made accessible via an integrated cloud infrastructure. The cloud infrastructure not only provides access to cloud infra services 122 but also to billing services and other monetization services. The cloud infrastructure may provide additional service abstractions such as Platform as a Service (PaaS), Infrastructure as a Service (IaaS), and/or Software as a Service (SaaS), depending upon embodiments.

The image analysis services 128 may comprise an image retriever 130, a memory buffer 132, an image preprocessor 134, a classifier 136, an analysis module 138, and a data store 140. The image retriever 130 is configured to receive captured images from the image capture device 106, the luminaire feedback device 108, the horticultural management device 112, the intermediate servers 114, and/or other data sources of the grow operation 104. The image retriever 130 may place one or more images in the memory buffer 132 where additional image processing services (e.g., image preprocessing, classification, analysis, etc.) may be applied.

The captured images in the memory buffer 132 may be provided to an image dispatcher service 142. The image dispatcher service 142 may be implemented by one or more applications that are executing on physical computers, one or more virtual machines, or software containers provided by cloud services 120. The image dispatcher service 142 is configured to control the order in which images included in buffer 204 are processed by an image processing pipeline that may be hosted on the central computing device 126. In various embodiments, image dispatcher service 142 may be configured to track the order of the subprocesses included in the image processing pipeline.

A subprocess load monitor 144 is configured to monitor one or more image queues 146 for a subprocess included in the image processing pipeline. In the event that one or more image queues 146 for a subprocess becomes full, the subprocess load monitor 144 may request that one or more additional virtual machines or containers be instantiated to help alleviate the bottleneck.

The captured image in the memory buffer 132 may also be persisted and aggregated in the data store 140. The data store 140 can comprise a data management layer that includes software utilities for facilitating the acquisition, processing, storing, reporting, and analysis of data from multiple data sources such as the luminaire feedback device 108, the image capture device 106, intermediate servers 114, horticultural management devices 112, and/or so forth. In various embodiments, the data store 140 can interface with an API for providing data access.

The image analysis services 128 can provide image analysis as well as problem identification and potential courses of action for remediation. Upon identifying at least one course of action for remediation, the image analysis services 128 may interact directly with a horticultural management device 112 or other components or devices used in the grow operation 104 via the luminaire feedback devices 108, intermediate servers 114, and/or other interfaces to the grow operation 104.

In another example, the image analysis service 128 may transmit to the horticultural management device 112, information related to problem identification. In various embodiments, the image analysis service 128 can request additional information from the horticultural management device 112. If multiple horticultural management devices 112 are used, the image analysis service 128 can request additional information from a selected horticultural management device of a plurality of horticultural management devices based on one or more conditions, such as the real-time location of the horticultural management device 112 and/or the registered operator or user (i.e., the worker 116) of the horticultural management device 112. In this regard, one or more workers 116 can be associated with a horticultural management device 112.

Additionally, or alternatively, one or more courses of action for remediation may be provided to a horticultural management device 112 that is operated by a worker 116 responsible for at least one grow operation 104 and/or a worker who is to perform the actual tasks comprising a course of action for remediation. In one embodiment, all or a portion of the course of action for remediation may be displayed in a horticultural management device 112 for view and interaction by the worker 116.

The horticultural management device 112 may be any networked computer, including mobile tablets over Wi-Fi and/or mobile tablets over a cellular network and/or laptops. The horticultural management device 112 may connect to the cloud 120, directly to the image analysis services 128, or directly to the grow operation 104, via intermediate servers 114, luminaire feedback devices 108, and/or other interfaces to the grow operation 104. Accordingly, the ORB-HFA system enables the collection of complete and comprehensive information collection, potentially to the point of one dedicated image capture device per plant, the offloading of image analysis services 128 to a central point (i.e., the computing device 126) for analysis and determining a course of action for remediation as needed, and the distribution of the course of action for remediation either directly with a grow operation, or to workers 116 responsible for the grow operation. In this way, the ORB-HFA system enables an improved horticultural feedback loop.

Figure 2:
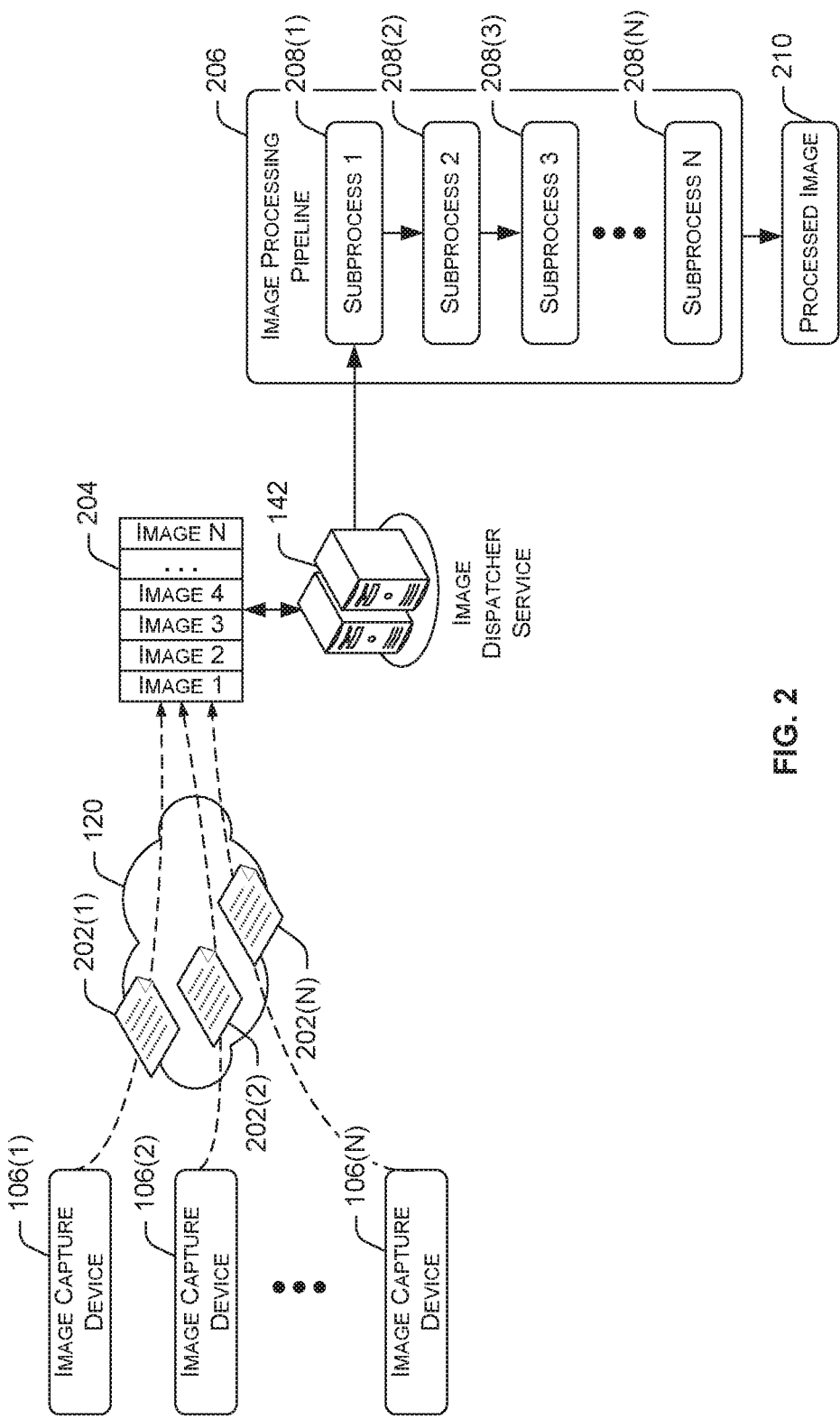
FIG. 2 is an example architecture for pipelined processing of plant images.

FIG. 2 shows an example architecture for a virtualized pipelined processing of plant images. The architecture for virtualization of the central computing device 126 may include a buffer 204, an image dispatcher service 142, and an image processing pipeline 206. In one example, buffer 204 is one possible implementation of the memory buffer of FIG. 1. Furthermore, the image processing pipeline 206 is one possible implementation of one or more of the components of the image analysis service of FIG. 1. For example, subprocess 208(1) may correspond to the operations performed by the image preprocessor, subprocess 208(2) may correspond to the operations performed by the classifier, subprocess 208(3) may correspond to the operations performed by the identifier, and subprocess 208(N) may correspond to the analyzer. Although FIG. 2 illustrates N processes any number of subprocesses may be included in the image processing pipeline 206. For example, each of the image preprocessing algorithms and/or each of the identifier algorithms may further be implemented by way of a respective subprocess. In one example, each of the subprocesses 208(1)-208(N) included in the image processing pipeline 206 represents at least one virtual machine and/or software container.

In one aspect, the image processing pipeline 206 uses parallel tasks (e.g., subprocesses 208(1)-208(N) to process a sequence of images 202(1)-202(N) captured by one or more image capture devices 106(1)-106(N). The image capture devices 106(1)-106(N) illustrated in FIG. 2 may represent a plurality of image capture devices 106 located at a single grow operation, a plurality of image capture devices dispersed across several grow operations of a single greenhouse, and/or a plurality of image capture devices located at disparate greenhouses and/or grow operations. Each of the subprocesses 208(1)-208(N) may implement a stage of the pipeline that allows the stages of the image processing pipeline 206 to execute concurrently, even though the images 202(1)-202(N) are processed in a particular order. The partially processed image is passed from one subprocess to another. The output (e.g., processed image 210) of the image processing pipeline 206 may occur in the same order as that of the input.

In operation, the image dispatcher service 142 is configured to control the order in which images included in buffer 204 are processed by the image processing pipeline 206. That is, in some examples, the images are not necessarily processed by the image processing pipeline 206 in the order the images are received in buffer 204. Rather, the images may be processed according to a priority scheme. For example, in some implementations, each image received from an image capture device 106 may include metadata that incorporates a date/time stamp indicating a date/time that the image was captured. Accordingly, image dispatcher service 142, in one example, may dispatch images from the buffer 204 to the image processing pipeline 206 based at least on the date/time stamp (e.g., oldest images sent first, newest images sent first, daytime images sent first, or images for a particular date/time range, etc.).

In another example, image dispatcher service 142 may be configured to dispatch images to the image processing pipeline 206 based on the location from which the image was taken (e.g., process images retrieved from a particular grow operation first). In yet another example, the image dispatcher service 142 may receive input from one or more of the subprocesses 208(1)-208(N) to determine which image to dispatch next. For example, analysis of an image might reveal an issue with a plant. The image dispatcher service 142 may communicate with a knowledge database to determine whether the issue is a time-sensitive issue. In this case, the image dispatcher service 142 may be configured to prioritize the dispatching of images of the same plant, similar plant, or plants in the same grow operation to the image processing pipeline 206.

In some implementations, image dispatcher service 142 may be configured to track the order of the subprocesses included in the image processing pipeline 206. For example, image dispatcher service 142 may maintain a state of which images have been dispatched to the image processing pipeline 206 and where they are in the pipeline. The state can be maintained in a state table. The state table can include a field for an image identification for an image or a partially processed image, the subprocess that was completed, failed, or in progress, the timestamp indicating when each subprocess started and finished, and/or so forth. The image dispatcher service 142 may wait for notifications from a virtual machine corresponding to a subprocess that the subprocess is complete before dispatching the image to the next subprocess, which may correspond to a second virtual machine. In various embodiments, the image dispatcher service 142 can query a virtual machine for status information if the virtual machine does not transmit notifications to the image dispatcher service 142 within a predetermined period of time after the subprocess starts.

The image dispatcher service 142 may also determine if the subprocess failed. After a predetermined number of failures, the failed images can be transmitted to an administrative portal (not shown) for review. In some cases, certain images, such as obscured images, low-light images, and/or low-quality images may be discarded and removed from the image processing pipeline 206. In such cases, the discarded images are not dispatched to the subsequent subprocesses and no further processing is performed. Upon processing the images 202(1)-202(N) through all of the subprocesses 208(1)-208(N), the image processing pipeline 206 produces a processed image 210. The processed image 210 can be stored in a data store and/or archived.

Figure 3:
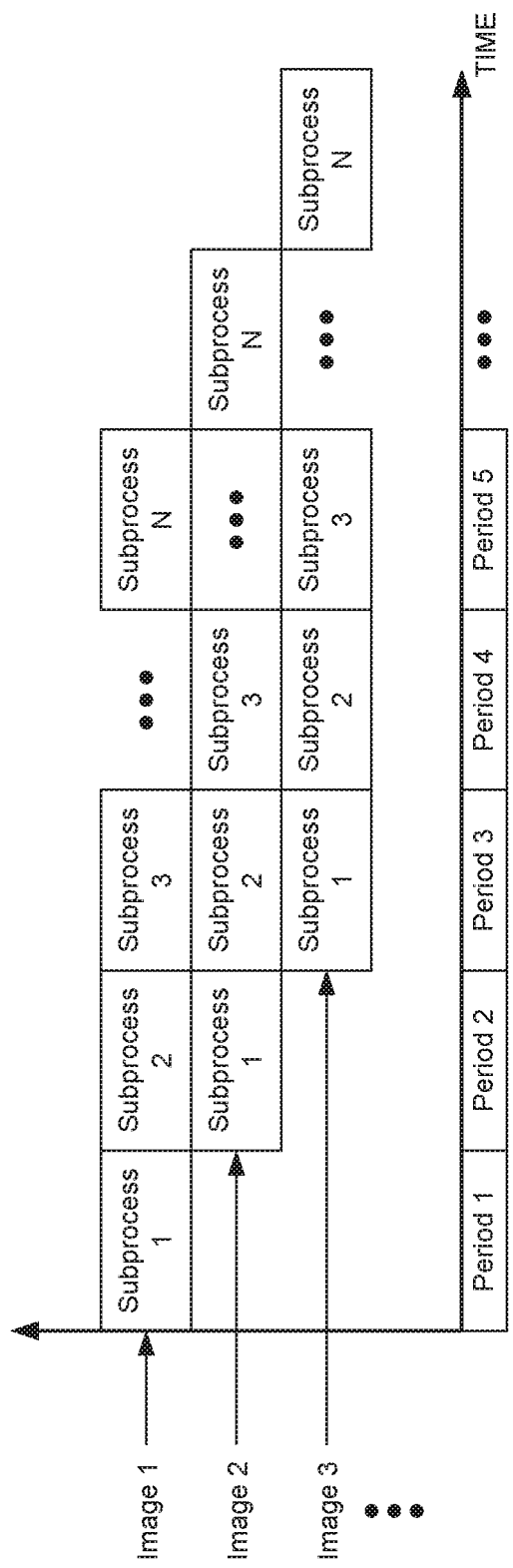
FIG. 3 illustrates an example scheduling diagram for pipelined processing of plant images.

FIG. 3 illustrates an example scheduling diagram for pipelined processing of plant images. For example, the top row shows that subprocess 1 begins its subprocessing of image 1 at time period 1. Subsequently, during time period 2, subprocess 2 begins its subprocessing of image 1, while subprocess 1 begins the concurrent subprocessing of image 2. Accordingly, if subprocess 1 represents the image preprocessor and the subprocess 2 represents the classifier, the image processing pipeline allows the image preprocessing of image 2 (e.g., by subprocess 1) to occur simultaneously with the image classification of image 1 (e.g., by subprocess 2).

Each of the illustrated subprocesses of FIG. 3 may be implemented by way of a respective virtual machine or software container. Thus, if enough virtual machines have been allocated to allow the pipeline's tasks to run in parallel, FIG. 3 shows that the expected execution time for three images in a pipeline with N subprocesses is approximately N+2 time periods. In contrast, sequential processing may take approximately 3×N because each of the N subprocesses must be processed one after another.

The average performance of the image processing pipeline improves as more images are processed. The reason for this, as FIG. 3 illustrates, is that some virtual machines are idle as the pipeline fills during startup and drains during shutdown. With a large number of images, the startup and shutdown time becomes relatively insignificant. The average time per image would approach one time period.

Figure 4:
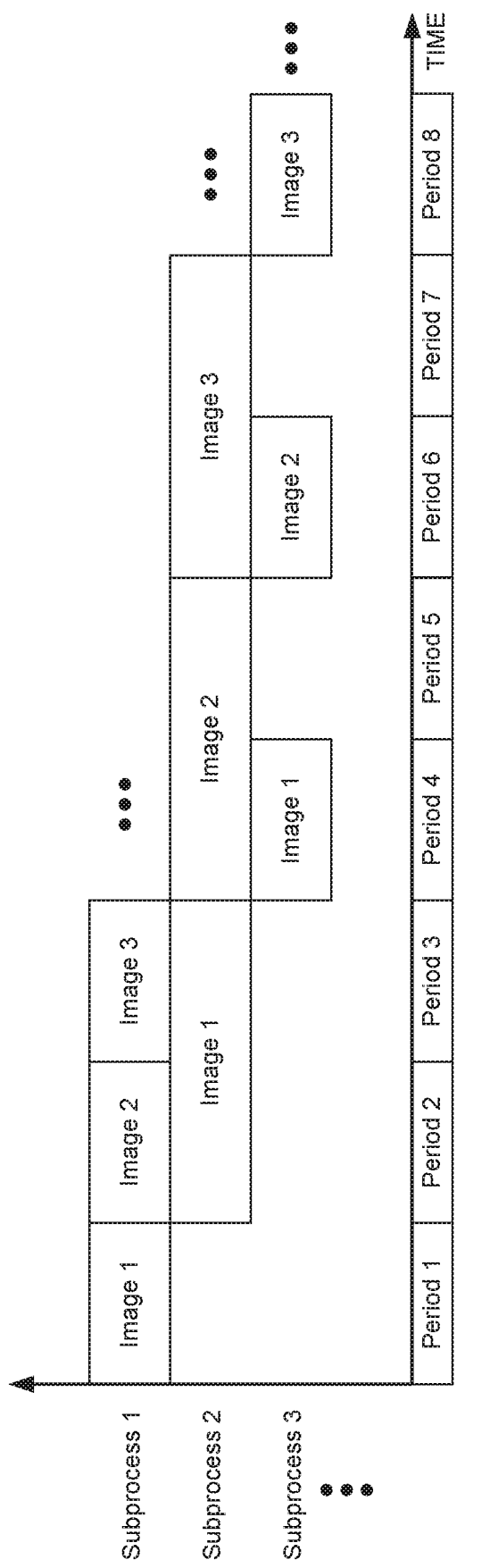
FIG. 4 illustrates another example scheduling diagram for pipelined processing of plant images.

The illustrated example of FIG. 3 assumes that each subprocess takes the same amount of time to perform its respective processing. However, in some embodiments, this may not be always the case. For example, FIG. 4 illustrates a scheduling diagram where the subprocess 2 takes twice as long to complete as the other subprocesses. As shown in FIG. 4, when one of the subprocesses takes twice as long, some of the virtual machines may periodically be idle. Therefore, the speed of a pipeline is approximately equal to the speed of its slowest stage.

Figure 5A:
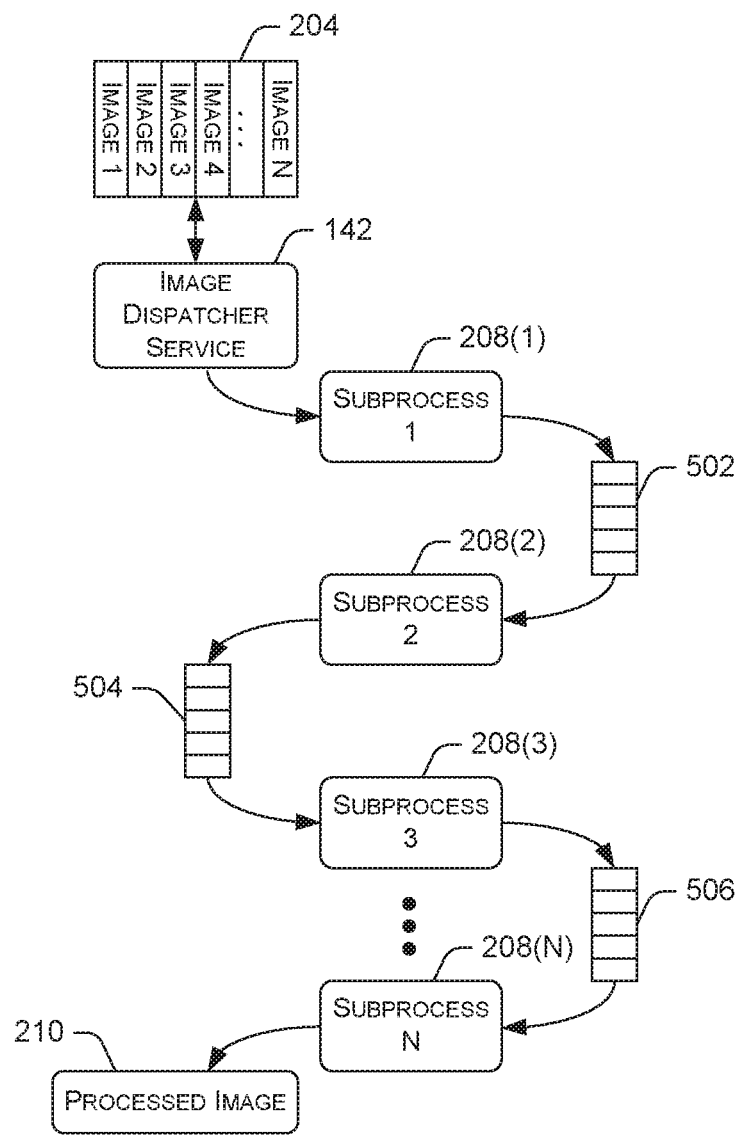
FIG. 5A illustrates an example architecture for pipelined processing of plant images including one or more queues.

FIG. 5A illustrates an example architecture for pipelined processing of plant images including one or more queues 502, 504, and 506. The image dispatcher service 142 receives images from the buffer 204. Each subprocess of the image processing pipeline of FIG. 5A reads from a dedicated input and writes to a particular output. For example, the image dispatcher service 142 transmits the images to subprocess 1 208(1), which in turn writes to queue 502. Subsequently, the subprocess 2 208(2) reads from queue 502 and writes to queue 504. This process continues under the processed image 210 is generated.

All the subprocesses of the image processing pipeline can execute at the same time because concurrent queues buffer any shared inputs and outputs. Thus, if there are four available virtual machines, the subprocesses 208(1)-208(N) can run in parallel. As long as there is room in its output queue, a subprocess of the pipeline can add the partially processed image it produces to its output queue. If the output queue is full, the subprocessing of the next image waits until space becomes available. Using buffers such as queues 502, 504, and 506 that hold more than one partially processed image at a time compensates for the variability in the time it takes to subprocess each image. Additionally, or alternatively, the next image may skip a subprocess and return to the skipped subprocess when space becomes available. In this way, the subprocesses of the image processing pipeline may not be executed in a particular order or sequence.

Figure 5B:
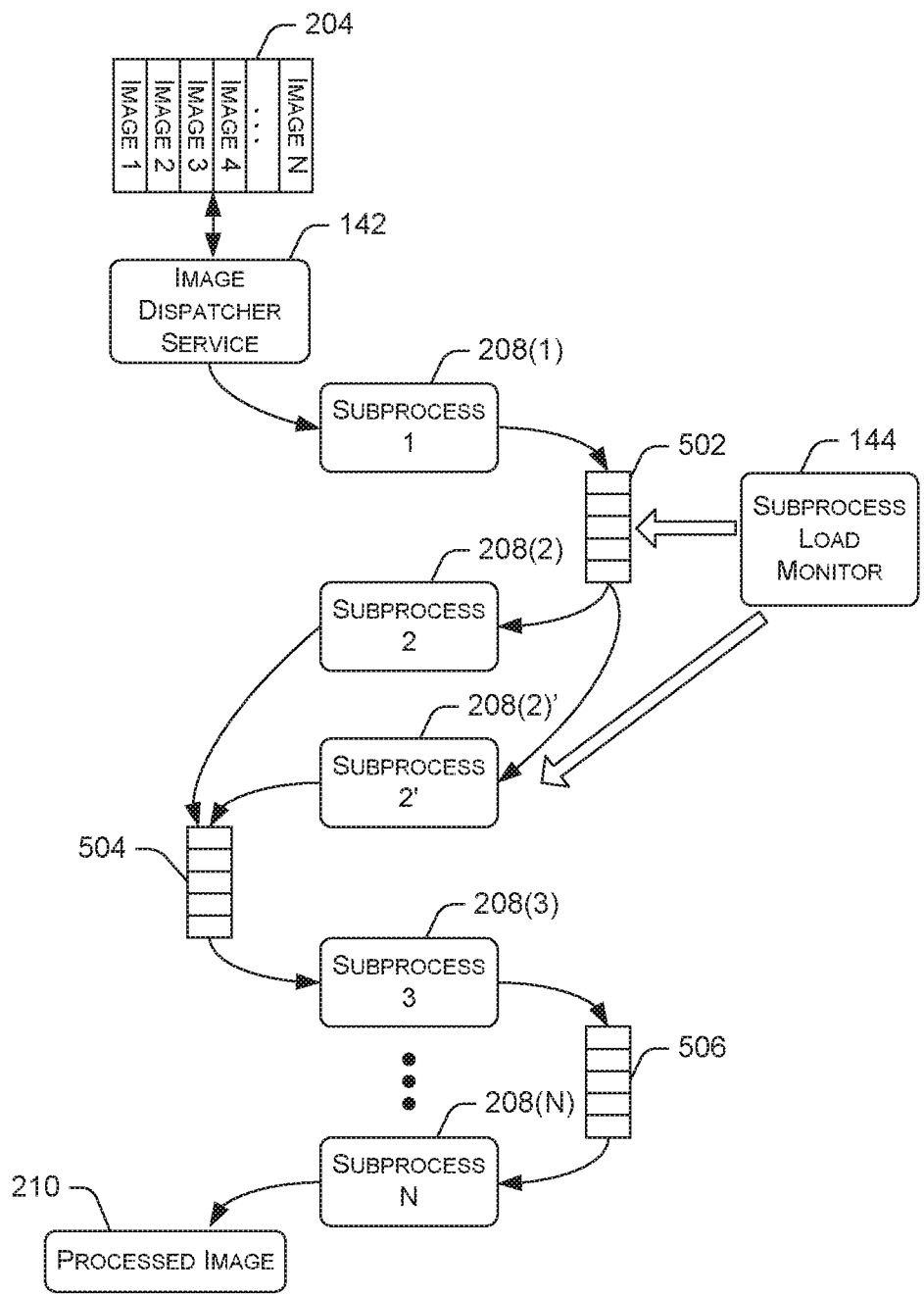
FIG. 5B illustrates an example architecture for pipelined processing of plant images including one or more queues and a subprocess load monitor.

FIG. 5B illustrates an example architecture for pipelined processing of plant images including one or more queues 502, 504, and 506 and a subprocess load monitor 144. As discussed above, some subprocesses included in the image processing pipeline 206 may take longer than other subprocesses. Thus, in some scenarios, one or more of the queues may become full, slowing down the entire pipeline. The subprocess load monitor 144 is configured to monitor one or more of the queues 502, 504, and 506. If a queue becomes too full (e.g., the number of images contained in the queue is greater than a threshold number or the processing time is greater than a time period threshold), then the subprocess load monitor 144 may request that one or more additional virtual machines or containers be instantiated to help alleviate the bottleneck. For example, the subprocess load monitor 144 may monitor the queue 502 and in response to determining that the queue 502 is too full, may instantiate a new virtual machine corresponding to subprocess 2' 208(2)' to perform the same operations as subprocess 2 208(2). Thus, in some implementations, the image processing pipeline of FIG. 5B may be configured to perform the same subprocess, but on different images concurrently. Additionally, or alternatively, the image processing pipeline of FIG. 5B may be configured to perform the same subprocess, but on different portions of the same images concurrently.

In various embodiments, the image processing pipeline may be configured to implement branched subprocesses 208(1)-208(N). In this regard, one or more operations of one subprocess may depend on the outcome of one or more operations of another subprocess. For example, preprocessing of an image may reveal that the image was obtained under certain lighting conditions (e.g., low-light, normal-light, high-light, etc.). Thus, subsequent subprocesses 208(1)-208(N) may be instantiated that are specific to the determined lighting condition. That is, a set of subprocesses specific for low-lighting conditions may be instantiated in response to subprocess 1 208(1) determining that an image is a low-light image. In another example, a subprocess may be instantiated to perform an operation dependent on the outcome of the previous subprocess. For example, analysis of an image may reveal an anomaly on one or more leaves of a plant, whereas a subprocess is instantiated to determine the nature of the anomaly.

Figure 6:
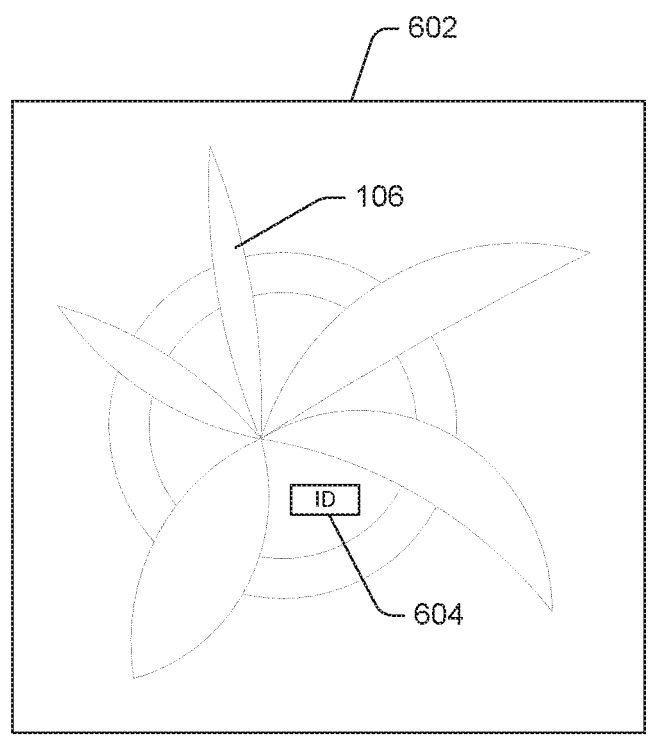
FIG. 6 illustrates an example image captured by an image capture device for use in horticultural feedback analysis.

FIG. 6 illustrates an example image 602 captured by an image capture device for use in horticultural feedback analysis. As mentioned above, image capture devices are configured to capture one or more images of plants or groupings of plants included in a grow operation. In one example, each image 602 includes a single (e.g., no more than one) plant. In other examples, each image 602 may include more than one plant. In various embodiments, however, each image 602 can depict a target, or an item of interest such as a person, a machine, an object, and the like.

As mentioned above, the processing of the images by image analysis services, image processing server, and/or image processing pipeline may include classifying the plant as a certain plant type, and/or identifying the plant as the same plant that was previously identified. In some implementations, each plant included in the grow operation may be affixed with an identifier 604. Thus, an image 602 can depict one or more identifiers 604 that are affixed to the plants. The identifier 604 may include one or more visual matrix codes, such as QR codes, Aztec Codes, Maxi Codes, or other visually-readable identifiers such as a barcode that provides the type of plant and/or a unique identifier of this particular plant. In some examples, the visual matrix codes may be analyzed after the image 602 has been uploaded to the image processing server. In other examples, the image capture device may include a reader (e.g., barcode reader and/or QR code reader) to read the identifier 604. Thus, in this example, the image capture device may be configured to append the plant identification into metadata associated with each image 602.

In yet other examples, the identifier 604 may include a radio-frequency identification (RFID) and/or near-field communication (NFC) tag. Thus, the image capture device may include an RFID reader and/or NFC reader to detect the identifier 604 and append corresponding plant identification data into the captured image.

The image 602 may represent one image obtained by an image capture device. In some implementations, hundreds, if not thousands of images may be obtained and uploaded to the image processing server. Thus, in some examples, the image processing server may be configured to perform image selection to reduce the number of images stored. For example, after processing a number of images received from a certain grow operation, the image processing server may determine that nothing abnormal appears in any of the images (i.e., no issues, no anomalies, etc.). Thus, rather than storing all images received from the grow operation, the image processing server may store a subset (one or more) of the images received as representative of all images obtained from that grow operation.

Example Computing Device Components

Figure 7:
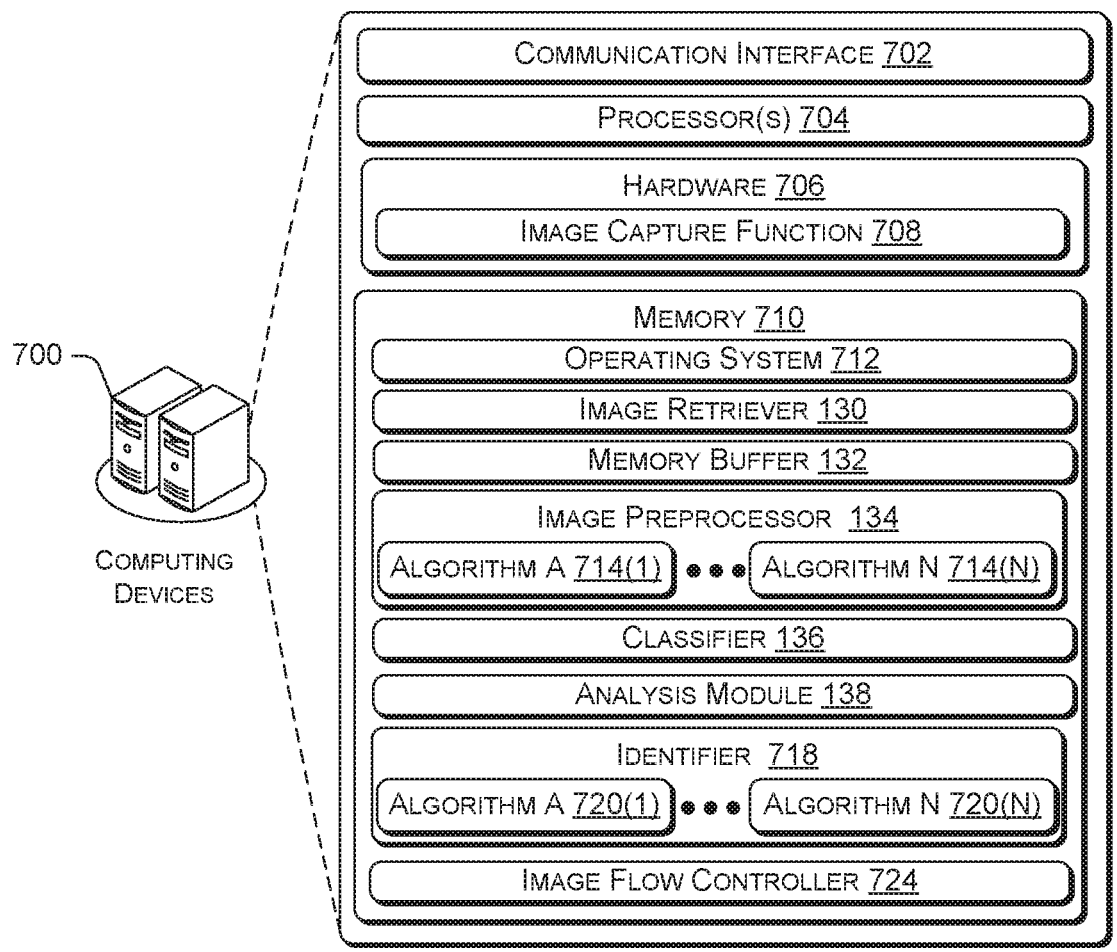
FIG. 7 is a block diagram of an exemplary hardware, software and communications environment for object recognition based horticultural feedback analysis.

FIG. 7 is a block diagram showing various components of illustrative computing devices 700 for providing the ORB-HFA and related techniques such as image analysis services. The computing devices 700 can comprise an image processing server, an intermediate server, a central computing device, and/or so forth. It is noted that the computing devices 700 as described herein can operate with more or fewer of the components shown herein. Additionally, the computing devices 700 as shown herein or portions thereof can serve as a representation of one or more of the computing devices of the present system.

The computing devices 700 may include a communication interface 702, one or more processors 704, hardware 706, and memory 710. The communication interface 702 may include wireless and/or wired communication components that enable the computing devices 700 to transmit data to and receive data from other networked devices. In at least one example, the one or more processor(s) 704 may be a central processing unit(s) (CPU), graphics processing unit(s) (GPU), both a CPU and GPU or any other sort of processing unit(s). Each of the one or more processor(s) 704 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution.

The one or more processor(s) 704 may also be responsible for executing all computer applications stored in the memory, which can be associated with common types of volatile (RAM) and/or non-volatile (ROM) memory. The hardware 706 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices. Additionally, the data input devices may include an image capture function 708. In some embodiments, the image capture function 708 can be a part of a luminaire feedback device.

The memory 710 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The memory 710 may also include a firewall. In some embodiments, the firewall may be implemented as hardware 706 in the computing devices 700.

The processors 704 and the memory 710 of the computing devices 700 may implement an operating system 712. The operating system 712 may include components that enable the computing devices 700 to receive and transmit data via various interfaces (e.g., user controls, a communication interface, and/or memory input/output devices), as well as process data using the processors 704 to generate output. The operating system 712 may include a presentation component that presents the output (e.g., display the data on an electronic display, store the data in memory, transmit the data to another electronic device, etc.). Additionally, the operating system 712 may include other components that perform various additional functions generally associated with an operating system.

The processors 704 and the memory 710 of the computing devices 700 may also implement an image retriever 130, a memory buffer 132, an image preprocessor 134, which may further include one or more image preprocessing algorithms 714(1)-714(N), a classifier 136, an analysis module 138, an identifier 718 which may further include one or more identifier algorithms 720(1)-720(N), and an image flow controller 724.

The image retriever 130 manages the receiving of images from image capture functions 708. The throughput of images and supplementary data may differ. Accordingly, the image retriever 130, may manage the timing, speed, and a party (e.g., image dispatcher service, computing devices, image capture functions, image capture devices, etc.) controlling the data transfer. For example, the image retriever 130 may act as a simple data store, which receives and stores images upon receipt as pushed by an image capture function 708. Alternatively, the image retriever 130 may affirmatively pull images for image capture functions.

One example of a pull scenario is where one or more computing devices 700 are first joining the network. The image capture function 708 may be implemented in another computing device or a luminaire feedback device. When this happens, one or more image capture functions 708 could potentially overload the computing devices 700 by sending a large number of images. To prevent overload, the image retriever 130 may negotiate a controlled transfer with the one or more image capture functions 708.

When the image retriever 130 receives an image, it may store the received image in the memory buffer 132. The memory buffer 132 is dedicated memory, generally part of the memory 710, where a retrieved image may reside to be processed. Common memory buffers 132 are contiguous dedicated RAM, where the data comprising an image may be accessed directly rather than via a series of central processing unit commands. Generally, such a configuration is via a GPU.

Once an image is in the buffer 132, the image may be subjected to one or more image processing and analysis operations. The image preprocessor 134 performs any transformations to an image enable analysis to increase the likelihood of successful analysis. Example operations to enable analysis are to decompress and/or decrypt incoming images via the respective decompression and/or decryption algorithms 714(1)-714(N). Example operations to increase the likelihood of successful analysis to apply one or more transformations and/or content analysis algorithms 714(1)-714(N) are Gaussian blur and Red-Green-Blue (RGB) content analysis.

Generally, an analysis is performed later in the image workflow of the computing devices 700. Where possible, algorithms 714(1)-714(N) attempt to take partial images, corrupt images, or otherwise substandard images and apply corrections sufficient to support analysis. However, the image preprocessor 134 may also contain logic to remove images with insufficient information or low-quality images from the workflow. In this way, data collected during subsequent analysis will not contain data from corrupt or misleading images. This cleaning logic may be part of the image preprocessor 134 or alternatively may be in a separate image cleaning software component.

Once preprocessing is complete, the classifier 136 is configured to identify which portions of an image represent the plant to be analyzed as opposed to portions of the image representing items other than the plant to be analyzed. The classifier 136 identifies discrete objects within the received image and classifies those objects by size and image values, either separately or in combination. Example image values include inertia ratio, contour area, and Red-Green-Blue components. Based on those values, the objects are ranked and sorted. Items above a predetermined threshold or the highest N objects are selected as portions of the received image representing the plant.

After classification, the identifier 718 is configured to identify the plant in the received image and to identify artifacts in the plant. The identifier 718 may compare the image data of the plant in the received image to that of other images. To perform these comparisons, the identifier 718 may create a plant state vector comprised of values and value sets generated by one or more algorithms 720(1)-720(N) of the identifier 718. Such a constructed vector corresponds to the state of a plant in an image and is compared against other plant state vectors to perform general comparisons as well as sequential analysis.

The identifier 718 contains several identification algorithms 720(1)-720(N). Some algorithms 720(1)-720(N) work directly on a single image. Other algorithms 720(1)-720(N) may process a series of images classified together into a category, collect information in common, and apply to subsequent images. Example categories may be images of the same plant or groupings of plants over time, images of the same genus and species of plant, and images of plants given the same care, and/or so forth.

One example of the latter case is where the identifier 718 collects color histogram data over a plurality of images of the same category and generates an average histogram comprised of the averages or weighted averages of each distribution variable comprising the histogram. Accordingly, when an image is received belonging to the same category, the identifier 718 may use the average histogram to identify the plant and artifacts in the plant. The average histogram is then recalculated using the histogram of the incoming image. In this way, the average histogram becomes an adaptive histogram with improving performance. In some embodiments, the logic to perform analysis using data from a plurality of images, or performing computationally intense logic, may be separated from the identifier 718 into another software component such as an edge cleaner software component.

The analysis module 138 takes the transformed image, and potentially any generated additional information, such as a plant state vector, and maps portions of the image to indicia corresponding to a feature of a plant. These indicia are called an artifact. Because the classifier 136 identified objects comprising portions of a plant, those portions may be subjected to analysis of visual information. Because the identifier 718 may have generated branch information about plant branches, leaf structure, and root structure, branch analysis may identify not only artifacts but artifacts indicating issues in the plant.

If at least one artifact corresponds to an issue with a plant, the analysis module 138 may also retrieve corresponding recommended courses of action to remediate the issue. Such information may be subsequently sent to the grow operation, intermediate server, luminaire feedback device, image capture device, and/or other entry points into the grow operation.

The computing devices 700 may have access to a data store. The computing devices 700 may store raw images, transformed images, generated plant state vectors, and other related information for archival and/or reporting after processing is complete. The data store may be configured as a relational database, an object-oriented database, a NoSQL database, and/or a columnar database, or any configuration to support scalable persistence.

Reporting may be performed by a querying software component (not shown). Because each image is associated with a plant, date/time stamp, plant state vector, and potentially identified issues, images may be queried by any or all of these data values.

As described above, the ORB-HFA provides infrastructure capable of collecting images and other information on a per plant basis, applying sophisticated image analysis, applying sophisticated horticultural analysis to diagnose problems and recommend a remedial course of action, all while distributing the relevant information to workers and or devices in the grow operation.

The image flow controller 724 is configured to manage the capture of images and receive images from an image capture device (if not integrated with the image capture function 708). Additionally, the image flow controller 742 can locally manage received images, and potentially transmit the received images from the image capture function 708 over a network. The image flow controller 724 may store a configuration setting of how many images an image capture device is to capture, the resolution the image is to be captured, the format the image is to be stored, and any other processing to be performed on the image. The image flow controller 724 may store a captured and/or received image in the memory buffer 132 and designate the file name of the received image. The image flow controller 724 may operate with other applications that may perform additional image processing, such as compression and/or encryption.

The image flow controller 724 may also manage the transmission of received images. Specifically, it may transmit an image to a known network location via the network interface 702. The known network locations may include an intermediate server, the Internet, the cloud, and/or so forth.

Upon transmission, the image flow controller 724 may enlist in notifications to determine that the transmission was successful. The image flow controller 724 may also transmit notifications to other device subscribing to its notifications indicating the status of the transmission.

In some implementations, the computing devices 700 may include a physical computer server (e.g., on-site or off-site server). However, in other examples, image processing server 218 may be implemented by way of one or more virtual machines or software containers provided by cloud services 220. As used herein, virtual machines may include virtual engines (VEs) and virtual private servers (VPS). A software container refers to an isolated virtual user-space instance that may behave like a real server. For example, forms of software containers may include Docker® containers developed by Docker, Inc., Drawbridge® containers developed by the Microsoft Corporation, LXD® containers developed by Canonical Ltd., and/or so forth.

Virtualization, in the form of virtual machines or in the form of containers, allows multiple applications to run on the same physical machine in a fully isolated and portable way. With virtualization, each application runs as if it is the only application using the server and operating system's resources, without interfering with any of the other applications running on the server.

A virtual machine may utilize a hypervisor, which creates and manages virtual machines on a physical machine. The virtual machines may provide an abstraction of the physical machine that includes a basic input/output system (BIOS), network adapters, disk, and CPU. Every virtual machine running on a physical server runs a separate instance of the operating system. In fact, virtual machines deployed to a server can run different versions of the operating system or even different operating systems. A hypervisor creates and runs different virtual machines.

Virtual machines may solve several server management issues facing enterprises, where machines are more fully utilized. Spinning up a new virtual machine is fast relative to bringing a new physical server online, so provisioning is simpler. If there is a hardware failure on a server, it can be addressed by simply moving the virtual machine to another physical machine. Virtual machines also provide hardware isolation, which brings with it a high level of security.

Because utilization is increased, and provisioning times are reduced, operational teams are more efficient when using virtual machines. The ability to run multiple operating systems means that second, parallel servers do not need building when upgrading.

With containers, the operating system, not the physical hardware, is virtualized. Applications are run in containers as microservices that provide the entire runtime image, including libraries and any other dependencies. Instead of using a separate hypervisor to provide virtualization, containers may rely on the functionality of the underlying operating system kernel to restrict an application to certain features and file systems. In containers, applications share the kernel but have separate user spaces.

The separation of user spaces allows an application to be deployed along with any third-party libraries on which it needs to run. It also isolates an application's use of resources from other processes outside of the container. While containers can include multiple related applications, they are commonly used to provide fine-grained levels of functionality and support of services or even a microservices-based architecture of application deployment.

Figure 8:
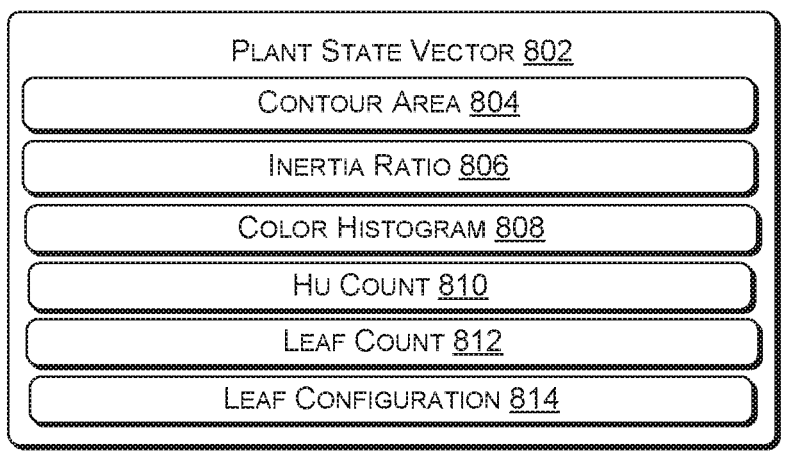
FIG. 8 is an exemplary plant state vector for object recognition based horticultural feedback analysis.

FIG. 8 shows a diagram of an exemplary plant state vector 802. The plant state vector 802 is a data representation that captures the state of a plant as interpreted from an image. During image preprocessing, classification, and identification, image information is extracted via various image operations. The image information not only can be persisted in a plant state vector such that the information need not be recalculated, but also that information can act as a proxy for the plant during comparison operations. By comparing at least a portion of the plant state vector, the image analysis service may determine whether plants represented in different images should be analyzed together. The plant state vector 802 comprises the contour area 804, inertia ratio 806, color histogram 808, Hu count 810, leaf count 812, and leaf configuration 814 as calculated during preprocessing, classification, and identification.

The contour area 804 is a value from performing contour tracing, a technique used in feature recognition. Specifically, a tessellation is overlaid over an image, and a threshold color difference, and/or a border pixel width, are specified to be interpreted as the border between features in an image. The contour area 804 is performed during classification when the image is analyzed to identify plant and non-plant features, as well as during identification, where artifacts of the plant are identified. Upon performing a contour trace, the contour area is the area of the image known to represent the plant.

The inertia ratio 806 is a value from performing shape factor analysis, a technique used in determining how much a shape in an image deviates from an expected shape. For example, a portion of a plant may be identified as an artifact. When the artifact deviates from an expected shape, the deviation may be an indication of an issue with the plant. The inertia ratio 806 is a value calculated to indicate the degree of deviation. Specifically, it provides a measure of the long-ness of a shape with respect to the degree of symmetry. For example, it can indicate how oval, a circular shape is.

A color histogram 808 is a pixel count organized into a histogram, where the histograms variables represent different colors. The colors may simply be red-green-blue or may be of a greater spectrum of colors. In one embodiment, the contour area 804, inertia ratio 806, and the color histogram 808 may be used to determine the likeliness that a portion of an image is to be considered representing a plant. For example, the following calculation may be used to rank image portions as likely representing a plant:

$$\text{Rank Value} = (\text{contour area} \times \text{inertia ratio}) \times [\text{green}/(\text{red}+\text{blue})]$$

For the plant state vector, the contour area 804, inertia ratio 806, and the color histogram 808 may be stored on a per image portion basis, or alternatively may be aggregated into a single contour area, inertia ratio, and color histogram for all the portions of the image deemed to represent a plant.

The Hu count 810 is a count of Hu moments which are a form of image moments in image processing. An image moment is a measure of pixel intensity. In the alternative, the actual moment calculations, rather than just the count, may be stored and image moment calculations need not be Hu moments.

The leaf count 812 is a value of the count of leaves (or needles) in the portions of an image deemed to be a plant. The leaf configuration 814 is a representation of the position and orientation of the leaves (or needles) in space. Image analysis can identify the configuration of an arbitrary branch structure. Accordingly, a plant state vector may alternatively include vein structure of leaves, branches of the plant, and the root structure of a plant. In general, branching for leaves, needles, branches, and roots may be stored as a tree structure where edges store lengths and nodes store the identity and orientation of edges corresponding to branches in space.

In one example, image A and image B may have similar metadata pertaining to a plant from the same greenhouse. In this case, a query may be applied to an image database and both images may be retrieved, and the plants in image A and image B may be understood to be similarly situated so that they should be analyzed together. In this regard, the plants in image A and image B may be expected to have similar degrees of health because they are similarly situated.

The plant state vector 802, either alone, or in conjunction with image metadata, can find comparable plants to a finer degree of resolution. If the plant state vector 802 includes a branch analysis of a plant in an image or includes a color histogram of the portions of the image relating to a plant, similarly situated plants can be retrieved in a query, even if they are located in different greenhouses or grown in different times. In this way, a plant suffering from rot in a first greenhouse may be retrieved along with another suffering from rot in a second greenhouse, grown at a different time. As with the previous example, a grower may take action to determine if there were similar causes. In some cases, data related to the plant state vector 802 can be stored in a database, which may also contain suggestions for causes of an identified issue. Thus, analysis by the grower may be aided by the database or automated.

There are many potential values that may be used for the plant state vector 802. Generally, the values chosen are to be mathematically transformational and translational invariant. Exemplary types of mathematical transformations are scaling, skewing rotation, reflection over a point and reflection over an axis. Additionally, a mathematical translation may consider a movement of an object in a particular direction through space. Specifically, even if a plant is moved, or rotated in the time between different images, the plant should be identifiable as the same plant.

Example Processes

FIGS. 9 through 12 present illustrative processes 900-1200 for providing object recognition horticultural based feedback analysis. The processes 900-1200 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 900-1200 is described with reference to FIGS. 1 through 8.

Figure 9:
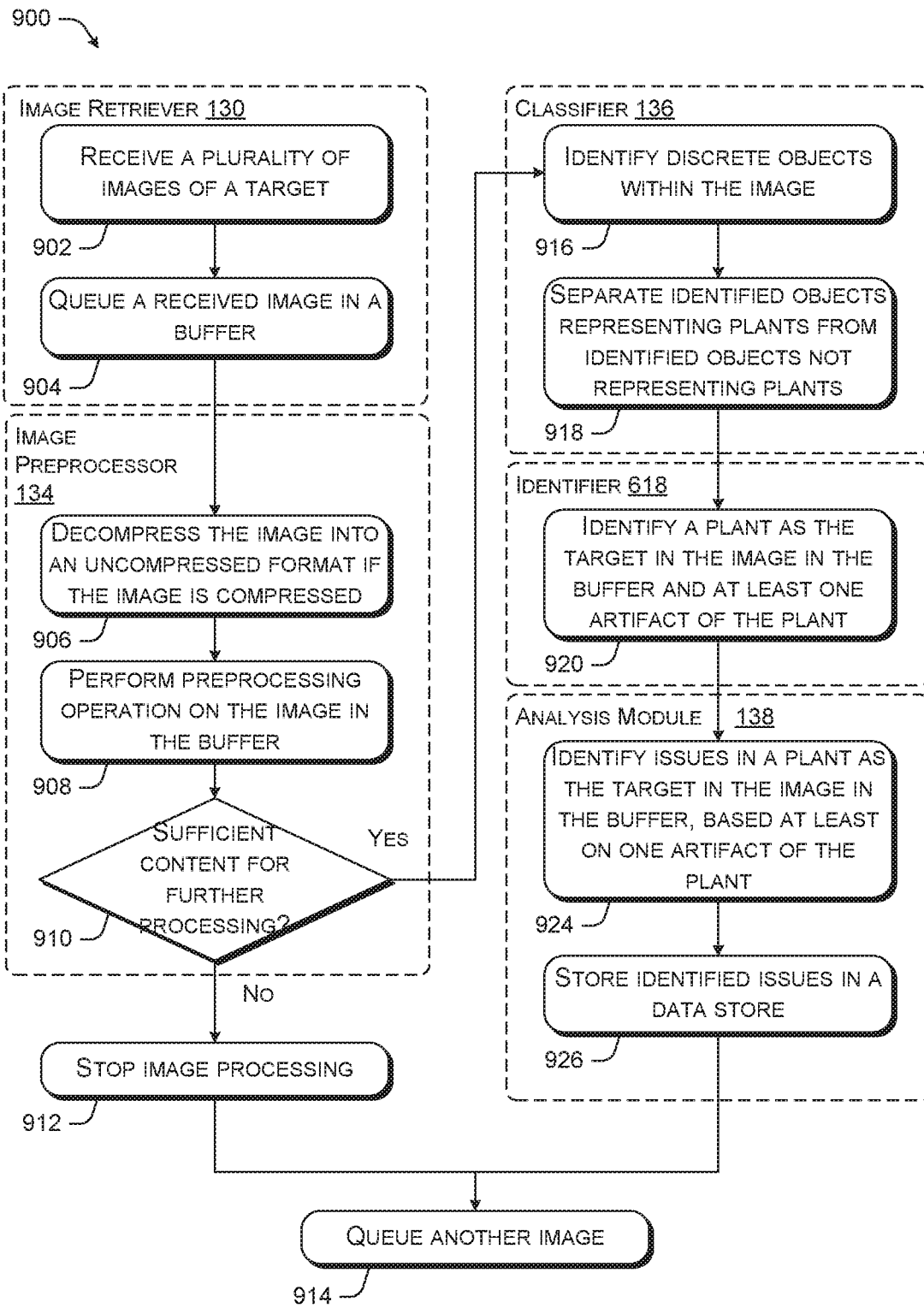
FIG. 9 is an exemplary flow chart of object recognition based horticultural feedback analysis.

FIG. 9 is a flow chart 900 of the generalized workflow for the ORB-HFA. At block 902, an image retriever 130 receives an image from an image capture function or an image capture device. Because of the relatively large amount of bandwidth used by image and/or video data, the image retriever 130 may perform a negotiated bandwidth transfer of images. For instance, the image retriever 130 may query an image capture function for the size of its image memory cache. In response, the image retriever 130 may calculate the sum total image memory cache of all image capture functions attempting to upload images. The image retriever 130 may then automatically schedule uploads based on available bandwidth. Additionally, or alternatively, the image retriever 130 may prioritize uploads or schedule uploads based at least on user input. In this way, image transfer may be performed during times with otherwise minimal network traffic and not interfere with another network use.

At block 904, the image retriever 130 stores at least one image for processing in a memory buffer. Once buffered, the image is preprocessed. At block 906, the image preprocessor 134 can decompress and/or decrypt the buffered image into its native format. In some cases, the native format of the buffered image may not be usable by preprocessing algorithms, identifier algorithms, and/or other algorithms. In this case, the image preprocessor 134 may convert the buffered image from its native format to the applicable file format or a predetermined file format (e.g., Joint Photographic Experts Group (JPEG), Tagged Image File Format (TIFF), Graphics Interchange Format (GIF), Windows bitmap (BMP), Portable Network Graphics (PNG), etc.).

At block 908, the image preprocessor 134 may apply one or more preprocessing algorithms. Preprocessing algorithms may be directed to filtering and/or enhancing, which increases contrast, pixel intensity, and other attributes to optimize image recognition. Preprocessing algorithms may also be directed to eliminating noise. In general, preprocessing algorithms are directed to an image processing operation that will aid subsequent classification and identification image processing. Exemplary image processing algorithms may include the pre-calculation and generation of a red-green-blue histogram or other histograms with pixel color counts as a variable. Additionally, or alternatively, the histogram may be a hue-luminance-saturation histogram of colors. The generated color histogram may be stored in a plant state vector. In some cases, the color histogram pre-calculation may be used with an adaptive histogram aggregating information from a plurality of images.

Other exemplary image processing algorithms may include a count of mathematical morphological operations. Mathematical morphology is an application of mathematics to image processing to determine the shape and spatial attributes such as size, convexity, connectivity, and geodesic distance. These attributes may be manipulated using morphological operations such as erosion, dilation, opening, and closing. For example, an algorithm may count the number of morphological opens and closes to help determine sub-shapes in an image. Other exemplary image processing algorithms may apply a transform to the image to make the image clearer or otherwise easier to discern features during classification and identification. One example algorithm applies a Gaussian function on a per pixel basis in an image. In this way, pixels with high contrast with respect to neighboring pixels are attenuated to lower contrast base on the Gaussian function.

Other exemplary image processing algorithms may apply filters to the image which, while removing information, increase contrast to better discern features during classification and identification. One example algorithm is Otsu segmentation. Specifically, Otsu segmentation is the setting of one or more filters using a color attribute such as hue, luminance or saturation, or alternatively red-green-blue value, to segment an image into zones, each zone having its own color in high contrast with respect to neighboring segments. Otsu segmentation generally transforms an image into grayscale zones. The resulting image may then be used as a filter or stencil with respect to the original image.

At decision block 910, the image preprocessor 134 may determine whether the buffered image comprises sufficient information for an ORB-HFA application. For example, the image preprocessor 134 may determine that the memory buffer does not comprise sufficient information for analysis if the memory buffer comprises a partial file or a corrupt file. In various embodiments, corrupted files may be preprocessed by applying pre-processing algorithms to repair the files. If a buffered image does not comprise sufficient information ("no" response from the decision block 910), the buffered image is discarded as indicated in block 912. Similarly, in some cases, preprocessing may result in a buffered image that comprises insufficient information. For example, the generated color histogram indicates that the image is mostly dark, suggesting an obstructed camera. By way of another example, during Otsu segmentation, it may appear that the image does not contain enough segments indicating an image where sub-shapes could not be determined. To avoid the introduction of erroneous or corrupted images into classification and identification, the image preprocessor 134 may discard images as indicated in block 912.

If a buffered image comprises sufficient information ("yes" response from the decision block 910), the buffered image is classified. Classification is the identifying of plant versus non-plant portions of the image. At block 916, the classifier 136 identifies discrete objects within the buffered image. The image preprocessor algorithms may generate a list of objects in the image by applying a segmentation algorithm such as Otsu segmentation. Accordingly, different portions of the image may be identified as discrete objects or contiguous sets of pixels corresponding to an item whose image was captured in the buffered image. If segmentation is not completed by the image preprocessor 134, then the classifier 136 may generate the discrete object list.

At block 918, the classifier 136 may classify the discrete objects into plant and non-plant objects. Upon obtaining a discrete object list for the buffered image, the objects may be sorted by size, from the largest to the smallest. A predetermined threshold may be specified for the maximum size and the minimum size. In this way, only the image objects of a certain size within the predetermined threshold may be processed to reduce the processing load.

A rank value is calculated for the N largest objects. The rank value generally relates to an indication that a discrete object's shape and color corresponds to an expected plant feature. After calculation of the rank values, the top X values, X being a predetermined threshold, will be deemed to be representing a plant in the image. In this way, only discrete objects deemed to represent the plant are differentiated from discrete objects deemed not to represent the plant in the buffered image.

After classification, the portions of the buffered image deemed to represent a target, or an item of interest in the image is processed by the identifier software component and identifier algorithms to identify the identity of the target in the image. While the target may be any item captured in the image, a person, a machine, and the like, generally the target will be a plant. The degree of identification may simply be to identify the genus and species of the plant in the buffered image. However, this information may also be in metadata already. The identification may also be of a particular plant e.g. the ninth red rose shrub out of a lot of twelve. Because information is stored on a per plant basis, some identification algorithms may determine that an object is the same plant as in another image, but just moved or rotated.

At block 920, artifacts comprising the plant in the buffered image are identified by the identifier 718. More specifically, the identifier 718 may apply one or several algorithms to segment the portions of the buffered image deemed to represent a plant as opposed to the entire buffered image. The portions may then be segmented, for example using Otsu segmentation. Where segments and attributes of the segments such as morphological attributes and color match a plant, a positive identification of the plant may be achieved.

Because the plant may comprise a plurality of discrete objects, not only can the plant be identified, but discrete objects comprising the plant may also be identified. These discrete objects, such as petals and leaves, comprise artifacts of the plant. Prior to segmentation, the identifier software component may apply additional preprocessing specific to the discrete objects deemed to represent a plant. Some of this preprocessing makes use of adaptive and iterative techniques.

At block 924, the analysis module 138 may identify issues associated with the identified plant if the artifacts of the plant deviate from an expectation. At block 926, identified issues may be stored in a data store. Additionally, the original buffered image, metadata of the image, a plant state vector, data generated during preprocessing and other processing, and identified issues may be stored together in the data store. Upon processing the image to identify a plant, the plant's artifacts, and/or potential issues with the plant, processing may continue by queuing another image as indicated in block 914.

Notwithstanding FIG. 9, image processing is not necessarily linear. In some cases, image processing may involve the aggregation, or the statistical combining of information from multiple images to create a baseline or basis to compare images and artifacts in images. Such a creation of a baseline, where the baseline may change as new images are processed is called adaptive processing.

Figure 10:
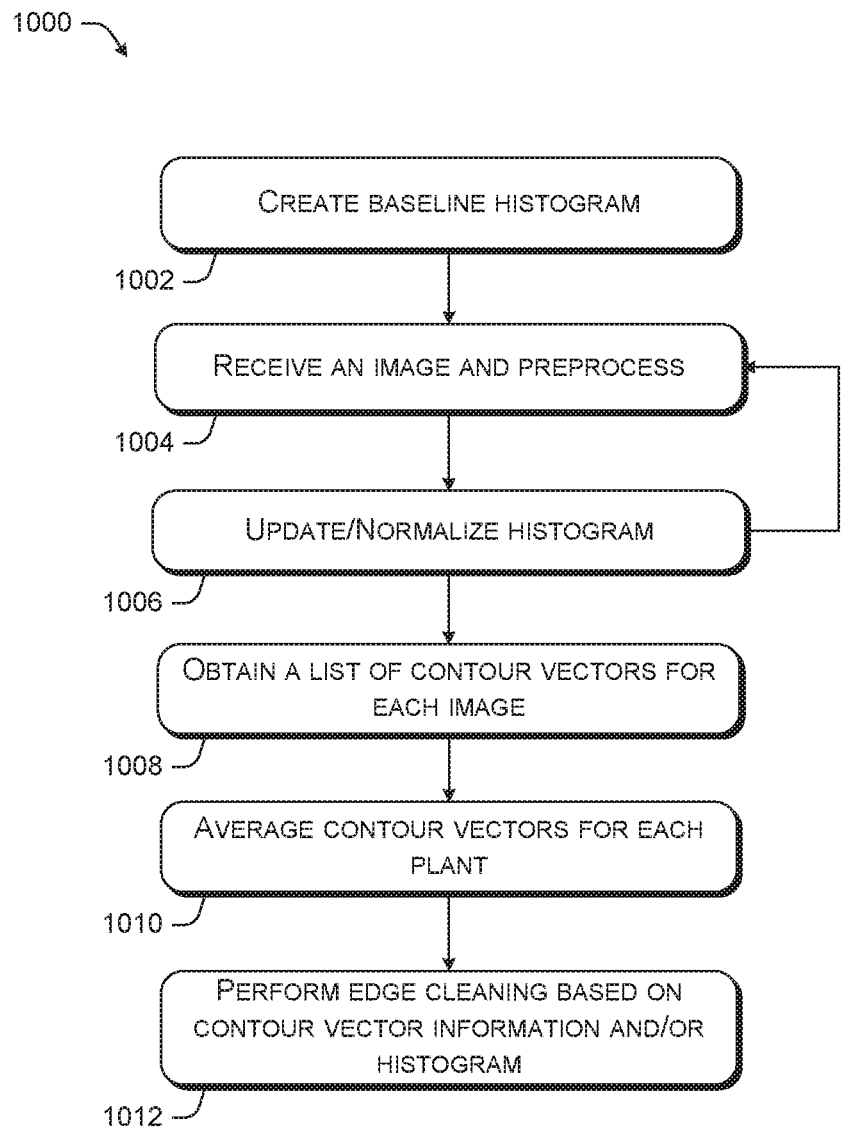
FIG. 10 is an exemplary flow chart of identification processing for object recognition based horticultural feedback analysis.

FIG. 10 is a flow chart 1000 of an example of adaptive processing. Specifically, a color histogram is generated that captures statistically aggregated information over multiple images, and the adapting histogram is used during identification to refine artifacts of plants in an image. This process may be referred to as edge cleaning. Edge cleaning may be performed by the identifier software component or may be performed by a separate software component.

At block 1002, a baseline histogram is initialized. The variables of the histogram may be set to zero or a prior histogram may be used. The baseline histogram may be adapted by adding information from additional images during processing. At block 1004, an image is retrieved, buffered, and preprocessed. During preprocessing, histogram information, such as red-green-blue histogram information and/or hue-luminance-saturation information is extracted from the buffered image.

At block 1006, the extracted histogram information is incorporated into the baseline histogram. The extracted histogram information may be added to the baseline histogram on a per variable basis. Additionally, or alternatively, the added histogram information may be weighted. In this way, the baseline histogram adapts into a statistical aggregated of multiple images to conduct updates or normalization. The baseline histogram may be calculated over a large number of images. When the histogram is deemed to have a critical mass of information, individual images may be processed. The histogram can be continuously updated and/or normalized. At block 1008, a list of contour vectors is created. At block 1010, the contour vectors are averaged for each plant in the image.

At block 1012, the contour information and/or the baseline histogram, after the baseline histogram is deemed to have sufficient information, is used to perform edge cleaning, or preprocessing steps to enhance artifacts of the plant in the buffered image. At this point, the buffered image is ready for identification by the identification software component. The identification software component may calculate the ranking value of artifacts.

After identification of a plant and artifact of the plant, the plant is analyzed. The analysis may be static, specific to a single image, or sequential, an analysis of multiple images over time. Many times, image information extracted or generated from an image is aggregated with other static analysis information from other images which subsequently are collectively subjected to sequential analysis.

Figure 11:
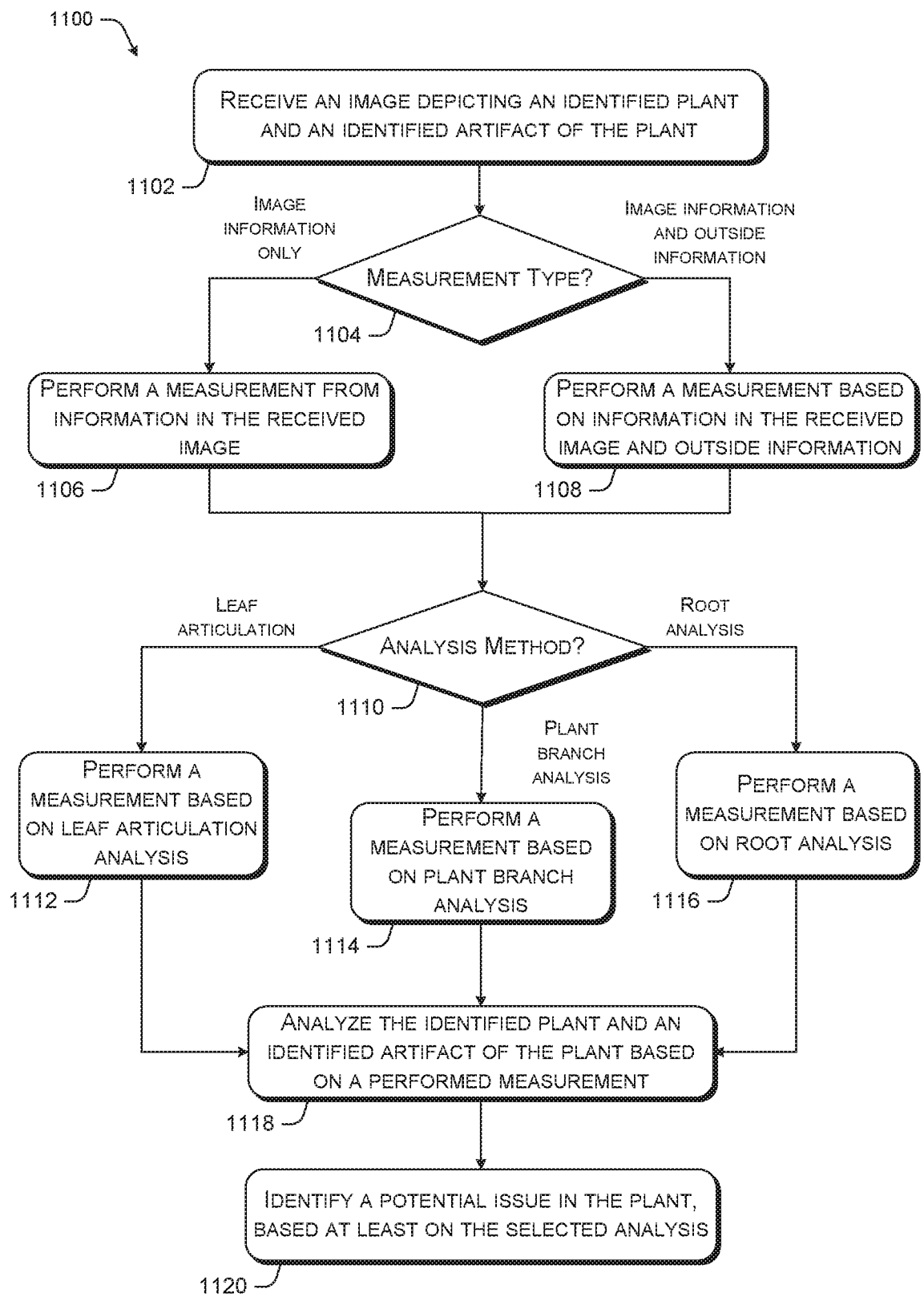
FIG. 11 is an exemplary flow chart of static analysis via object recognition based horticultural feedback analysis.

FIG. 11 is a flow chart 1100 of a framework for static analysis. Static analysis is the analysis with a single image as its subject. At block 1102, the image analysis service receives an image depicting a plant, a discretely defined group of plants, and/or an artifact of the plant that has been identified. Because the analysis involves a single image, some analyses may supplement information. At decision block 1104, the image analysis service determines whether measurement type includes image information only or image information and outside information. Examples of outside information include metadata, administrative intervention, information within the plant state vector, and/or a pre-calculated histogram. If the measurement uses only information in the image, then the measurement is performed as indicated in block 1106. Otherwise, the measurement, including the outside information as well as information in the image is performed as indicated in block 1108.

At decision block 1110, the measurement is analyzed using various analysis method. In the illustrated embodiment, the analysis includes leaf articulation, plant branch analysis, and root analysis. At block 1112, the image analysis service performs a measurement based on leaf articulation analysis. Leaf articulation analysis is the study of the orientation of artifacts identified as leaves of a plant. Generally, leaves are expected to turn towards the source of light. Where leaves fail to do so, or not enough leaves do so, an issue of the plant may be identified.

At block 1114, the image analysis service performs a measurement based on plant branch analysis. Plant branch analysis is the generation of a computer representation of the size and orientation of the branches of a plant. A similar analysis may be made of roots at block 1116 or even the veins on a leaf. General branch analysis is also known as component modeling. Leaf articulation at block 1112, plant branch analysis at block 1114 and root analysis at block 1116 may be performed at the same time or in a sequential manner.

Leaf articulation, plant branch, and root analysis measurements may be simply made and analyzed in isolation. At block 1118, the image analysis service analyzes the identified plant and an identified artifact of the plant based on a performed measurement. At block 1120, the image analysis service identifies a potential issue in the plant, based at least on the selected analysis. The identified issue may be stored in a data store for subsequent reporting. Additionally, or alternatively, the results of the static analysis may be compared to subsequent analyses of the plant as part of a sequential analysis.

Figure 12:
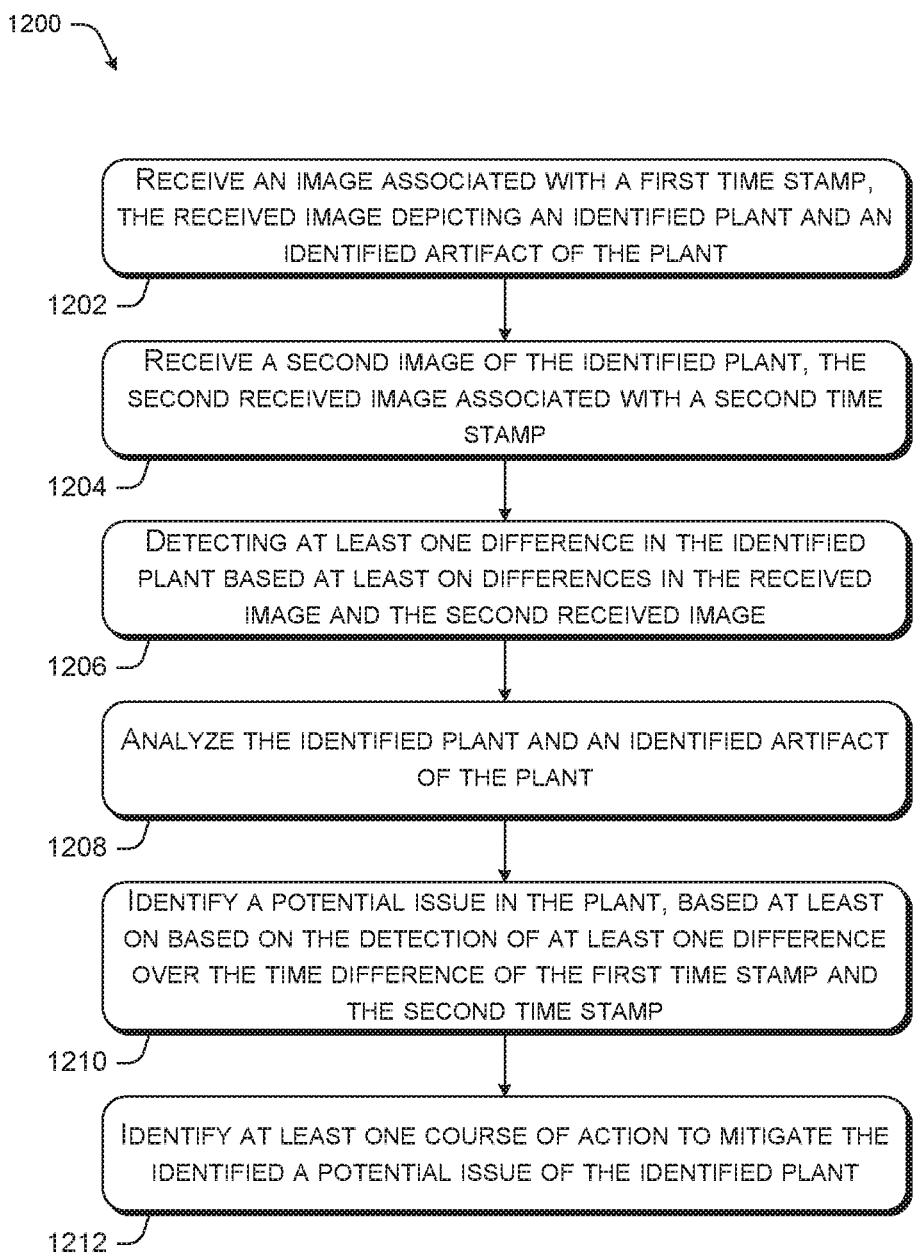
FIG. 12 is an exemplary flow chart of sequential analysis via object recognition based horticultural feedback analysis.

A sequential analysis differs from a static analysis in that sequential analysis makes use of multiple images over time. FIG. 12 is a flow chart 1200 of a framework for sequential analysis. At block 1202, the image analysis service receives a first image depicting a plant, a discretely defined group of plants, and/or at least one plant artifact. The image can be time stamped when received at the image analysis service. At block 1204, the image analysis service receives a second image comprising the plant and at least one plant artifact with a second time stamp.

At block 1206, the two images are compared, and differences are identified. It is noted, however, that sequential analysis is not limited to two images. Additional images may be used. The images themselves may be compared as well as any metadata associated with the images and any pre-calculated or pre-generated information on the images including the plant state vector. For example, if a branch representation was generated as part of branch analysis for either of the images, a comparison of the images may include a comparison of the respective branch analyses. In this regard, information on the image may be generated from the metadata and/or pre-calculated or pre-generated information, and that information may be compared. For example, the color information in the plant state vector may be used to generate values for both the first image and the second image, and the color information may be compared. Because the images include information of artifacts comprising the respective plants, the comparison between the two images may be made of the plant as a whole and on a per artifact basis.

At block 1208, identified differences between the two images are analyzed. For instance, continuity analysis may be performed, which is the identification of particular causes for a change. In another example, validation analysis may be performed to confirm that the plants compared are indeed the same plant. In this way, comparing the two images is validated. One embodiment of validation analysis is to perform a 2+1 analysis. For the plant in the first image and the plant in the second image, a vector is generated for each plant image. Because the images are generally captured via the same image capture device, a measurement of the Euclidean distance between the plants may be calculated. Where the distance is over a predetermined threshold, a determination of whether the plant was simply moved and/or rotated may be made, thereby confirming that the plant identified in the image and second image is the same plant, and may, therefore, be compared.

At block 1210, issues may be identified based at least on the analysis. Where changes in values, such as motion, are above a predetermined threshold, continuity analysis, or the identification of causes of the change may be brought to bear. Data store may contain a database of image artifacts corresponding to likely diagnoses as well as potential remediation courses of action. At block 1212, the database may be searched for a diagnosis and/or remediation course of action. In various embodiments, the data store may comprise a solutions table from which a remediation course of action may be selected based at least one the diagnosis.

In various embodiments, trends across an entire grow operation may be detected using a plurality of images. Accordingly, in addition to comparing images of the same plant, comparisons may be made of similarly situated plants. For example, other plants of the same species in the same grow operation, may be searched for indications of any identified issues in a single plant.

Figure 13:
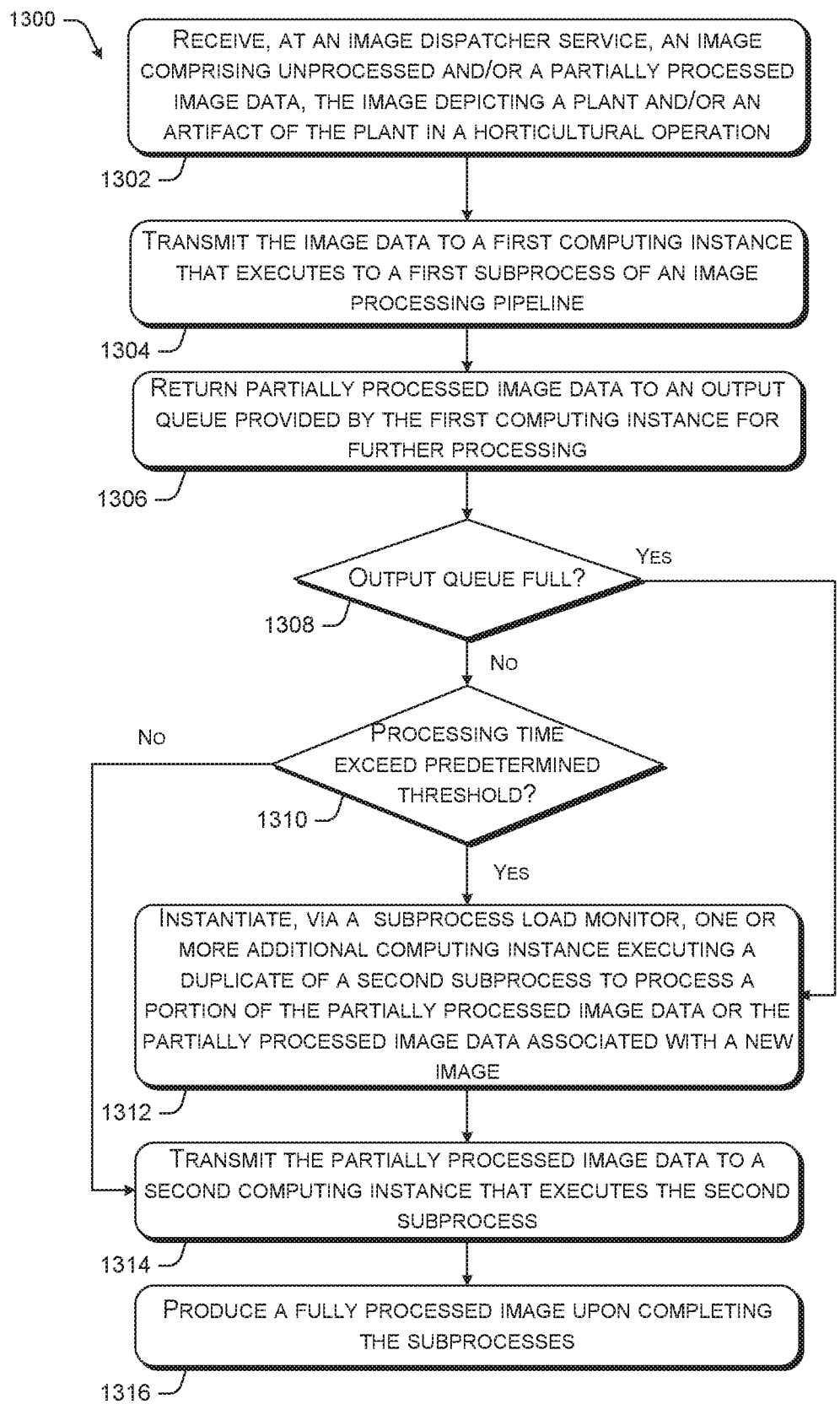
FIG. 13 is an exemplary flow chart for monitoring grow operations using an image processing pipeline via one or more virtual machines or one or more software containers provided by cloud services.

FIG. 13 shows a flow chart 1300 of a framework for monitoring grow operations using an image processing pipeline, which can comprise one or more virtual machines or one or more software containers provided by cloud services. At block 1302, the image dispatcher service receives an image comprising an unprocessed and/or a partially processed image data. The image depicts a plant and/or an artifact of the plant in a horticultural operation. At block 1304, the image processing pipeline transmits the image data to a first computing instance that executes a first subprocess of an image processing pipeline. The computing instance can be provided by a computing device, a virtual machine, and/or a software container. In various embodiments, the image data can be transmitted to one or more computing instances that provide subprocesses of the image processing pipeline such that one or more subprocesses can run in parallel. The image data may be sorted and/or received in a specific order, for example, in an order of priority.

The first subprocess of the image processing pipeline can generate partially processed image data from the image data. At block 1306, the partially processed image data is returned to a first output queue provided by the first computing instance for further processing. At decision block 1308, a subprocess load monitor determines whether the output queue is full. If the output queue is full ("yes" response from the decision block 1308), the subprocess load monitor can instantiate an additional computing instance executing a duplicate of a second subprocess of the image processing pipeline to process a portion of the partially processed image data, as indicated in block 1312. Additionally, or alternatively, the subprocess load monitor can instantiate an additional computing instance executing a duplicate of a second subprocess of the image processing pipeline to process unprocessed and/or partially processed image data associated with a second image received at the image dispatcher service. If the output queue is not full ("no" response from the decision block 1308), the subprocess load monitor determines whether the processing time at the virtual machine or container for the subprocess exceeds a predetermined time period threshold, as indicated in decision block 1310. If the processing time exceeds the predetermined time period threshold ("yes" response from the decision block 1310), the subprocess load monitor can instantiate an additional computing instance executing a duplicate of a second subprocess of the image processing pipeline to process a portion of the partially processed image data, as indicated in block 1312. Additionally, or alternatively, the subprocess load monitor can instantiate an additional computing instance executing a duplicate of a second subprocess of the image processing pipeline to process unprocessed and/or partially processed image data associated with a second image received at the image dispatcher service.

If the processing time is less than the predetermined threshold ("no" response from the decision block 1310), the image processing pipeline transmits the partially processed image data to a second computing instance that executes the second subprocess, as indicated in block 1314. In various embodiments, the image processing pipeline passes the partially processed image to a selected computing instance that executes a subprocess to perform one or more operations that may be dependent on the outcome of one or more operations of the previous subprocess executed by the previous computing instance. At block 1316, the image processing pipeline produces a fully processed image upon completion of the subprocesses. The fully processed image can be transmitted to a horticultural management device and/or other components of the horticultural operation in order to monitor the plant and/or the artifact of the plant of the horticultural operation.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
   receiving, at an image dispatcher service, an image associated with image data comprising an identification of an object depicted in the image;
   transmitting, from the image dispatcher service, the image data to a first computing instance that executes a first subprocess of an image processing pipeline;
   generating, via the first subprocess of the image processing pipeline, partially processed image data from the image data;

returning the partially processed image data resulting from the first subprocess executed by the first computing instance to an output queue that is provided by the first computing instance;
detecting a triggering event in the image processing pipeline;
instantiating an additional computing instance that executes a duplicate of a second subprocess for processing at least a portion of the partially processed image data in response to detecting the triggering event;
transmitting, from the output queue, the partially processed image data resulting from the first subprocess to the additional computing instance or a second computing instance that executes the second subprocess of the image processing pipeline;
producing, via at least the second subprocess of the image processing pipeline, a fully processed image associated with the image data; and
appending the identification of the object to the fully processed image.

2. The computer-implemented method of claim 1, wherein the triggering event is determining that the output queue is full.

3. The computer-implemented method of claim 1, wherein the triggering event is determining that a processing time of the second subprocess exceeds a predetermined time period threshold.

4. The computer-implemented method of claim 1, further comprising:
returning a new partially processed image data resulting from the second subprocess to an additional output queue that is provided by the second computing instance.

5. The computer-implemented method of claim 1, further comprising:
transmitting the image data to the first subprocess hosted on the first computing instance based at least on a priority scheme as determined by the image dispatcher service.

6. The computer-implemented method of claim 1, wherein the first computing instance or the second computing instance is provided by a computing device, a virtual machine, or a software container.

7. The computer-implemented method of claim 1, wherein the object comprises a plant.

8. A system, comprising:
one or more non-transitory storage mediums configured to provide stored computer-readable instructions, the one or more non-transitory storage mediums coupled to one or more processors, the one or more processors configured to execute the computer-readable instructions to cause the one or more processors to:
receive, at an image dispatcher service, an image associated with image data comprising an identification of an object depicted in the image;
transmit, from the image dispatcher service, the image data to a first computing instance that executes a first subprocess of an image processing pipeline;
generate, via the first subprocess of the image processing pipeline, partially processed image data from the image data;
return the partially processed image data resulting from the first subprocess executed by the first computing instance to an output queue that is provided by the first computing instance;
detect a triggering event in the image processing pipeline;
instantiate an additional computing instance that executes a duplicate of the second subprocess for processing at least a portion of the partially processed image data in response to detecting the triggering event;
transmit, from the output queue, the partially processed image data resulting from the first subprocess to the additional computing instance or a second computing instance that executes the second subprocess of the image processing pipeline;
produce, via at least the second subprocess of the image processing pipeline, a fully processed image associated with the image data; and
append the identification of the object to the fully processed image.

9. The system of claim 8, wherein the triggering event is determining that the output queue is full, and the one or more processors are further configured to:
receive, at the image dispatcher service, a new image comprising new image data;
transmit, from the image dispatcher service, the new image data to the first computing instance that executes the first subprocess of the image processing pipeline;
generate, via the first subprocess of the image processing pipeline, new partially processed image data from the new image data; and
process, via the additional computing instance the new partially processed image data.

10. The system of claim 8, wherein the triggering event is determining that a processing time of the second subprocess exceeds a predetermined time threshold, and the one or more processors are further configured to:
receive, at the image dispatcher service, a new image comprising new image data;
transmit, from the image dispatcher service, the new image data to the first computing instance that executes the first subprocess of the image processing pipeline;
generate, via the first subprocess of the image processing pipeline, new partially processed image data from the new image data; and
process, via the additional computing instance the new partially processed image data upon.

11. The system of claim 8, wherein the one or more processors are further configured to:
return a new partially processed image data resulting from the second subprocess to an additional output queue that is provided by the second computing instance.

12. The system of claim 8, wherein the one or more processors are further configured to:
transmit the image data to the first subprocess hosted on the first computing instance based at least on a priority scheme as determined by the image dispatcher service.

13. The system of claim 8, wherein one or more operations of the second subprocess is dependent on one or more operations of the first subprocess.

14. The system of claim 8, wherein the object comprises a plant.

15. One or more non-transitory computer-readable media storing computer-executable instructions that upon execution cause one or more processors to perform acts comprising:
receiving, at an image dispatcher service, an image associated with image data comprising an identification of an object depicted in the image;
transmitting, from the image dispatcher service, the image data to a first computing instance that executes a first subprocess of an image processing pipeline;

generating, via the first subprocess of the image processing pipeline, partially processed image data from the image data;

returning the partially processed image data resulting from the first subprocess executed by the first computing instance to an output queue that is provided by the first computing instance;

detecting a triggering event in the image processing pipeline;

instantiating an additional computing instance that executes a duplicate of the second subprocess for processing at least a portion of the partially processed image data in response to detecting the triggering event;

transmitting, from the output queue, the partially processed image data resulting from the first subprocess to the additional computing instance or a second computing instance that executes the second subprocess of the image processing pipeline;

producing, via at least the second subprocess of the image processing pipeline, a fully processed image associated with the image data; and appending the identification of the object to the fully processed image.

16. The one or more non-transitory computer-readable media of claim 15, wherein the triggering event is determining that the output queue is full.

17. The one or more non-transitory computer-readable media of claim 15, wherein the triggering event is determining that a processing time of the second subprocess exceeds a predetermined time period threshold.

18. The one or more non-transitory computer-readable media of claim 15, wherein the acts further comprise:

transmitting the partially processed image data from the output queue to a third computing instance that executes a third subprocess of the image processing pipeline;

generating, via the third subprocess of the image processing pipeline, a new partially processed image data from the image data; and returning the new partially processed image data resulting from the third subprocess executed by the third computing instance to an additional output queue that is provided by the third computing instance.

19. The one or more non-transitory computer-readable media of claim 18, wherein the first computing instance or the second computing instance is provided by a computing device, a virtual machine, or a software container.

20. The one or more non-transitory computer-readable media of claim 15, wherein the object comprises a plant.

* * * * *